(12) United States Patent
Guo

(10) Patent No.: US 12,412,336 B2
(45) Date of Patent: Sep. 9, 2025

(54) DATA PROCESSING METHOD, DATA PROCESSING APPARATUS, AND COMPUTER-READABLE STORAGE MEDIUM

(71) Applicant: Tencent Technology (Shenzhen) Company Limited, Shenzhen (CN)

(72) Inventor: Xiaoxin Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 151 days.

(21) Appl. No.: 18/222,314

(22) Filed: Jul. 14, 2023

(65) Prior Publication Data

US 2025/0022214 A1 Jan. 16, 2025

Related U.S. Application Data

(63) Continuation of application No. PCT/CN2022/120782, filed on Sep. 23, 2022.

(30) Foreign Application Priority Data

Nov. 19, 2021 (CN) .......................... 202111400198.9

(51) Int. Cl.
*G06T 15/80* (2011.01)
*G06T 15/50* (2011.01)
*G06T 19/20* (2011.01)

(52) U.S. Cl.
CPC ............ *G06T 15/80* (2013.01); *G06T 15/506* (2013.01); *G06T 19/20* (2013.01); *G06T 2219/2016* (2013.01)

(58) Field of Classification Search
CPC ....... G06T 15/80; G06T 15/506; G06T 19/20; G06T 2219/2016
See application file for complete search history.

(56) References Cited

U.S. PATENT DOCUMENTS

2017/0011496 A1* 1/2017 Lu .............................. G06T 5/92

FOREIGN PATENT DOCUMENTS

| CN | 113648652 A | 11/2021 |
| CN | 114022607 A | 2/2022 |
| WO | WO-2021228031 A1 * | 11/2021 |

OTHER PUBLICATIONS

Cao, Ruizhi, et al. "Inverse matrix based phase estimation algorithm for structured illumination microscopy." Biomedical Optics Express 9.10 (2018): 5037-5051. (Year: 2018).*

(Continued)

*Primary Examiner* — Xin Sheng
(74) *Attorney, Agent, or Firm* — Morgan, Lewis & Bockius LLP

(57) ABSTRACT

This application discloses a method performed by a computer device. The method includes: obtaining service resource data in a virtual scene containing an area light; generating a target transformation matrix based on the inverse matrix transformation data, projectively transforming a vertex corresponding to vertex position data onto a spherical surface based on a target transformation matrix, shading point data and vertex position data, and generating a first lighting vector based on the vertex projectively transformed onto the spherical surface; determining relative position information between a shading point corresponding to the shading point data and the area light based on plane equation data and the shading point data, and a second lighting vector based on the relative position information and the first lighting vector; and generating target rendering data for rendering the virtual scene based on the second lighting vector and the inverse matrix transformation data.

20 Claims, 25 Drawing Sheets

(56) References Cited

OTHER PUBLICATIONS

Tencent Technology, WO, PCT/CN2022/120782, Dec. 27, 2022, 5 pgs.
Tencent Technology, IPRP, PCT/CN2022/120782, May 2, 2024, 6 pgs.
Tencent Technology, ISR, PCT/CN2022/120782, Dec. 27, 2022, 2 pgs.

* cited by examiner

DATA PROCESSING METHOD, DATA PROCESSING APPARATUS, AND COMPUTER-READABLE STORAGE MEDIUM

CROSS-REFERENCE TO RELATED APPLICATIONS

This application is a continuation application of PCT Patent Application No. PCT/CN2022/120782, entitled "DATA PROCESSING METHOD, DATA PROCESSING APPARATUS, AND COMPUTER-READABLE STORAGE MEDIUM" filed on Sep. 23, 2022, which claims priority to Chinese Patent Application No. 202111400198.9, entitled "DATA PROCESSING METHOD, DATA PROCESSING APPARATUS, AND READABLE STORAGE MEDIUM" filed with the China National Intellectual Property Administration on Nov. 19, 2021, all of which is incorporated by reference in its entirety.

FIELD OF THE TECHNOLOGY

This application relates to the field of computer technologies, in particular to a data processing method, a data processing apparatus, and a computer-readable storage medium.

BACKGROUND OF THE DISCLOSURE

With the widespread use of physics-based rendering in the field of real-time rendering, the importance of an area light has become higher and higher. The difference between the area light and classical lights such as directional lights and point lights is that the solution is an integration equation, and there is no analytical solution for a microfacet bidirectional reflectance distribution function (BRDF). The existing solution may approximate a function that does not have an analytical solution to another function that may obtain an analytical solution through linear transformation (such as linearly transform cosine (LTC)). Due to the accuracy, better performance and support for multiple types of lights, the LTC solution has become the preferred solution for application programs such as game clients that require real-time rendering of virtual scenes.

SUMMARY

Embodiments of this application provide a data processing method, a data processing apparatus, and a non-transitory computer-readable storage medium, which may improve the rendering efficiency.

An embodiment of this application provides a data processing method performed by a computer device, the method including:

obtaining service resource data associated with a virtual service scene containing an area light, the service resource data containing shading point data, inverse matrix transformation data, vertex position data and plane equation data associated with the area light;

generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface;

determining relative position information between a shading point corresponding to the shading point data and the area light based on the plane equation data and the shading point data in the service resource data, and determining a second lighting vector based on the relative position information and the first lighting vector; and generating target rendering data for rendering the virtual scene based on the second lighting vector and the inverse matrix transformation data.

An embodiment of this application further provides a computer device, including: a processor and a memory, where the processor is connected to the memory, the memory is configured to store a computer program that, and when executed by the processor, causes the computer device to perform the method provided in the embodiment of this application.

An embodiment of this application further provides a non-transitory computer-readable storage medium, storing a computer program that, when executed by a processor of a computer device, causes the computer device with the processor to perform the method provided in the embodiment of this application.

In the embodiments of this application, when a computer device with a rendering function detects that there is an area light in a virtual service scene, service resource data associated with the virtual service scene may be obtained, where the service resource data may include shading point data, inverse matrix transformation data, vertex position data and plane equation data associated with the area light. Further, the computer device may generate a target transformation matrix based on the inverse matrix transformation data, then projectively transform a vertex of the area light onto a spherical surface through the target transformation matrix, the shading point data and the vertex position data, generate a first lighting vector associated with the area light based on the vertex projectively transformed onto the spherical surface, then determine relative position information between a shading point corresponding to the shading point data and the area light based on the plane equation data and the shading point data, and then obtain a second lighting vector based on the relative position information and the first lighting vector to handle the orientation problem of different types of area lights. Finally, the computer device may generate target rendering data for rendering the virtual service scene based on the initial rendering data of the area light determined by the second lighting vector and the environmental rendering data of the virtual service scene determined by the inverse matrix transformation data. It can be seen that in the embodiments of this application, in the process of solving the integration of the area light (for example, generating a first lighting vector), horizon clipping is not considered. As a result, the number of instructions required for the entire rendering process may be effectively reduced, and the occupation of memory resources (such as register resources) of the computer device may be reduced, thereby improving the rendering efficiency.

BRIEF DESCRIPTION OF THE DRAWINGS

To describe the technical solutions in the embodiments of this application or in the related art more clearly, the following briefly introduces the accompanying drawings required for describing the embodiments or the related art. Apparently, the accompanying drawings in the following descriptions show merely some embodiments of this application, and a person of ordinary skill in the art may still obtain other accompanying drawings according to these accompanying drawings without creative efforts.

FIG. 9A-1 through FIG. 9A-5 and FIG. 9B-1 through FIG. 9B-4 are geometric schematic diagrams of a transformation matrix provided in an embodiment of this application.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments in this application without making creative efforts fall within the protection scope of this application.

Figure 1:
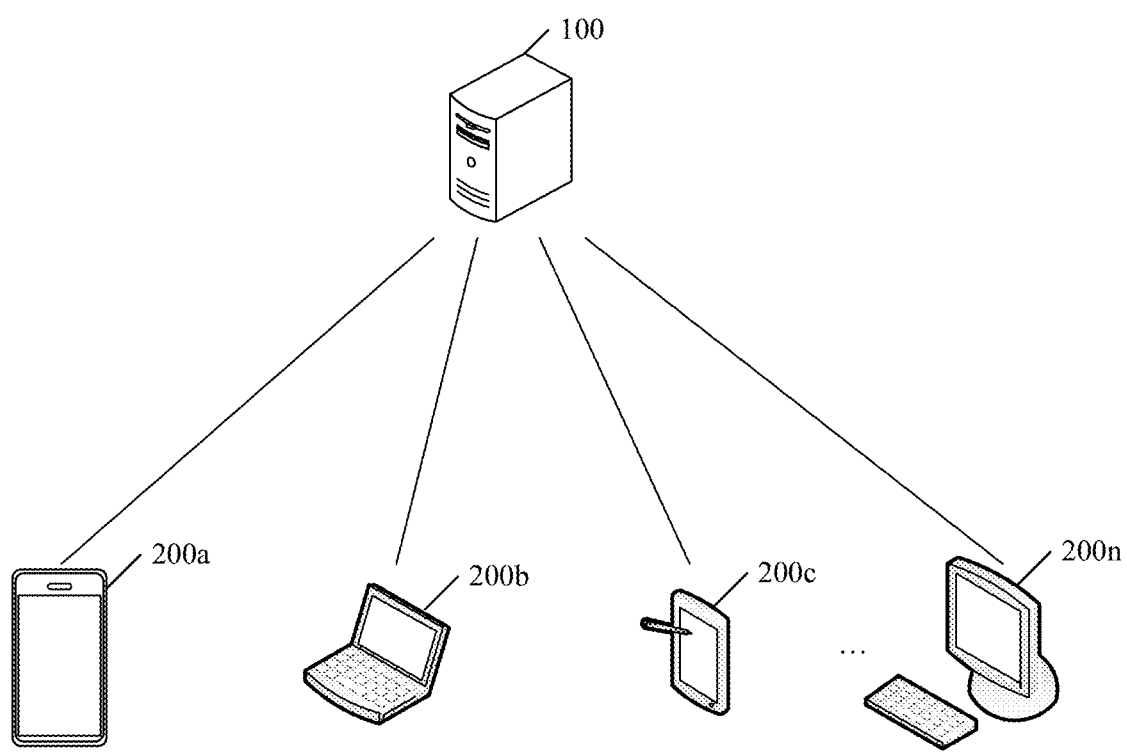
FIG. 1 is a schematic diagram of a system architecture provided in an embodiment of this application.

Referring to FIG. 1. FIG. 1 is a schematic diagram of a system architecture provided in an embodiment of this application. As shown in FIG. 1, the system architecture may include a server 100 and a user terminal cluster. The user terminal cluster may include one or more user terminals, and the number of user terminals is not limited here. As shown in FIG. 1, the user terminal cluster may specifically include a user terminal 200a, a user terminal 200b, a user terminal 200c . . . and a user terminal 200n. As shown in FIG. 1, the user terminal 200a, the user terminal 200b, the user terminal 200c . . . and the user terminal 200n may be respectively connected to the server 100 through a network, so that each user terminal may perform data interaction with the server 100 through the network connection. The connection mode of the network connection is not limited here. The network connection may be direct or indirect connection in a wire communication mode, direct or indirect connection in a wireless communication mode, or connection in other modes, which is not limited in this application.

Each user terminal in the user terminal cluster may include: smart phones, tablet computers, notebook computers, desktop computers, wearable devices, smart appliances, headset devices, and other intelligent terminals with a rendering function. It is to be understood that each user terminal in the user terminal cluster shown in FIG. 1 may be provided with an application client. When running in each user terminal, the application client may respectively perform data interaction with the server 100 shown in FIG. 1. The application client may include social clients, multimedia clients (such as video clients), entertainment clients (such as game clients), education clients, live streaming clients, and other application clients. The application client may be an independent client or an embedded sub-client integrated into a certain client (such as a social client, an education client, a multimedia client, or the like), which is not limited here.

As shown in FIG. 1, the server 100 in the embodiments of this application may be a server corresponding to the application client. The server 100 may be an independent physical server, a server cluster or distributed system composed of a plurality of physical servers, or a cloud server that provides basic cloud computing services, such as cloud services, cloud databases, cloud computing, cloud functions, cloud storage, network services, cloud communications, middleware services, domain name services, security services, content delivery networks (CDNs), big data and artificial intelligence platforms.

For the convenience of understanding, the embodiments of this application may select a user terminal from a plurality of user terminals shown in FIG. 1 as a target user terminal. For example, the embodiments of this application may use the user terminal 100a shown in FIG. 1 as a target user terminal, and a target application client may be integrated into the target user terminal. At this time, the target user terminal may perform data interaction with the server 100 through the target application client. The target application client here has the function of displaying data information such as texts, images, audios and videos. For example, the target application client may obtain and output a rendered image associated with a virtual service scene. It is to be understood that the virtual service scene here refers to a virtual space constructed according to service requirements (such as indoor and outdoor spaces in games), which may include all virtual articles and virtual objects in the virtual space. The virtual articles may include all scene articles (such as furniture, kitchenware and electric appliances), plants, animals, terrains (such as canyons, rivers and mountains), and the like except for the virtual objects. The virtual objects refer to virtual characters that may generate speech and behaviors, such as shooter characters in games and robot characters in cartoons, where the appearance, clothing, sound, action, facial expression, and the like of the virtual object may be constructed according to service requirements. At this time, in order to improve the picture effect of the finally presented rendered image, it is also necessary to implement environmental simulation for the virtual service scene, including simulation of changes in light and weather in the virtual service scene, such as day night, with/without lights, sunny day, rainy day, or snowy day.

Lights in virtual service scenes may be divided into point lights, line lights and area lights. The area light refers to a light-emitting mode. Compared with light-emitting diode (LED) point lights and ordinary lamp lights, existing area lights (such as flat panel lights) have the characteristics of soft light emission, eye protection, power saving, natural light, and the like. Area lights may further be divided into single-sided lights and two-sided lights. In the embodiments of this application, based on the shape of an area light, the area light may be referred to as a polygonal-light. For example, the shape of the area light may be a quadrilateral. The specific shape and type of the area light are not limited in the embodiments of this application.

The inventor of this application found that in the existing LTC solution, when the integration of an area light is solved, a clamped cosine function is used as a spherical function to integrate a polygon, and there is a corresponding analytical solution, so that rendering may be performed based on the analytical solution to obtain a rendered picture that simulates the reflection of the area light. However, there are still many challenges when applying the LTC to production projects on mobile platforms. For example, when a cosine function (that is, clamped cosine) is used for integrating a polygon, the integration is performed on an upper hemispherical surface, so it is necessary to perform horizon clipping on the upper hemispherical surface of the polygon. For example, a triangle intersects with the polygon to obtain a new polygon located on the upper hemispherical surface. In this way, when implementing horizon clipping on a graphics processing unit (GPU), due to the diversity of clipping modes, it will cause a large number of code branches and register occupation, thereby reducing the efficiency of rendering.

An embodiment of this application provides a real-time area light rendering method. The method may be performed by a computer device. The computer device includes, but is not limited to, a user terminal (such as the user terminal 200a shown in FIG. 1) or a server (such as the server 100 shown in FIG. 1). The computer device may be integrated with one or more GPUs, and a rendering function may be achieved by calling the GPU. Specifically, when there is an area light in a virtual service scene (that is, virtual non-real scenes provided in some services, also known as virtual scenes, as illustrated by a scene A below), the computer device may obtain service resource data associated with the virtual scene, where the service resource data may include relevant parameters required for rendering the virtual scene, and the parameters may specifically include shading point data, inverse matrix transformation data, vertex position data and plane equation data associated with the area light. It can be understood that the shading point data refers to position data corresponding to a shading point, and the shading point may be any point in the virtual scene. For example, the shading point may be a point on a virtual article or a virtual object in the virtual scene. The vertex position data refers to position data corresponding to a vertex of the area light. For example, if there is a quadrilateral area light B in the scene A, the vertex position data associated with the area light B may include the coordinates corresponding to four vertices of the area light B. The inverse matrix transformation data may include a normal vector, a view vector and roughness (that is, the roughness of an object surface where the shading point is located) corresponding to the shading point, where the view vector may be understood as an orientation of a virtual camera for the shading point or a view direction of a virtual character when observing the shading point, and the roughness is a variable redefined by human vision, so there is no relevant unit for the roughness. The three parameters may be used for generating an inverse matrix (that is, a target transformation matrix) required for the embodiments of this application. Therefore, in the embodiments of this application, the normal vector, the view vector and the roughness may be collectively referred to as inverse matrix transformation data. The plane equation data refers to data associated with a plane equation corresponding to a plane where the area light is located, and may specifically include a plane normal vector of the plane where the area light is located and a distance between an origin in a world coordinate system and the plane. In the embodiments of this application, the distance may be referred to as a light distance.

Further, the computer device may generate a target transformation matrix based on the foregoing inverse matrix transformation data, and the target transformation matrix may be used for transforming the coordinates of a vertex of the area light. Therefore, the vertex of the area light may be projectively transformed onto a spherical surface of a unit sphere where the shading point is located through the target transformation matrix, the shading point data and the vertex position data, and a first lighting vector associated with the area light may be generated based on the vertex projectively transformed onto the spherical surface. Subsequently, the computer device may determine relative position information between the shading point and the area light based on the plane equation data and the shading point data, and then obtain a second lighting vector based on the relative position information and the first lighting vector to handle the orientation problem of different types of area lights (including single-sided lights and two-sided lights). Finally, the computer device may generate target rendering data for rendering the virtual scene based on the initial rendering data of the area light determined by the second lighting vector and the environmental rendering data of the virtual scene determined by the inverse matrix transformation data. That is to say, lighting-associated shading on any shading point in the virtual scene is achieved. It can be seen that in the embodiments of this application, in the process of solving the integration of the area light (for example, generating a first lighting vector), horizon clipping is not considered. As a result, the number of instructions required for the entire rendering process may be effectively reduced, and the occupation of memory resources (such as register resources) of the computer device may be reduced, thereby improving the rendering efficiency.

In some embodiments, it can be understood that the server may obtain target rendering data through the process described above when obtaining the service resource data associated with the virtual scene, then generate a rendered image associated with the virtual scene based on the target rendering data, and return the rendered image to the user terminal connected to the server, so that the user terminal outputs the rendered image. Alternatively, the server may return the generated target rendering data to the user terminal connected to the server, so that after receiving the target rendering data, the user terminal generates a rendered image associated with the virtual scene based on the target rendering data and outputs the rendered image.

In some embodiments, it can be understood that the user terminal may also directly obtain the service resource data associated with the virtual scene, obtain target rendering data through the process described above, then generate a rendered image associated with the virtual scene based on the target rendering data, and output the rendered image.

It is to be understood that the foregoing real-time area light rendering method may be applied to various service scenes with area light rendering requirements, such as games, videos and instant messaging. Specific service scenes are not enumerated here.

For example, in a game scene, a computer device (such as the server 100) may obtain a virtual scene (such as a room C with an area light constructed in the virtual game) that a user (that is, a game player, such as a user X1) enters in the process of experiencing a virtual game through a target application client (such as a game client) on a user terminal (such as the user terminal 200a), then obtain service resource data D1 associated with the room C, obtain target rendering data E1 for rendering the room C based on the service resource data D1, then obtain a rendered image F1 for displaying the room C based on the target rendering data E1, and finally return the rendered image F1 to the user terminal 200a to be outputted. It can be understood that when a user experiences a virtual game, when the user controls a virtual object (that is, a virtual game character) to move, enter a new virtual scene, interact/converse with other virtual objects or perform other operations, the real-time update of the service resource data is triggered to obtain a corresponding updated rendered image. As a result, the user terminal may smoothly output high-quality game pictures (that is, rendered images) that change in real time when the user experiences the virtual game, thereby improving the game quality and the game experience of the game player. For example, when the user X1 controls a virtual object to move from a position C1 to a position C2 in the room C, an area light in the room C produces different lighting effects for different positions in the room C, so the game pictures presented at the position C1 and the position C2 are also different.

It is to be understood that when the virtual game is cloud gaming, the computer device (such as the server 100) may be a cloud gaming server associated with the cloud gaming. In other words, in a cloud gaming scene, the virtual scene is rendered by the cloud gaming server. The cloud gaming, also known as gaming on demand, is an online gaming technology based on the cloud computing technology. The cloud gaming technology enables thin clients with relatively limited graphics processing and data computing capabilities to run high-quality games. In the cloud gaming scene, the game does not run in a player game terminal (that is, a user terminal), but in the cloud gaming server, and the cloud gaming server renders the gaming scene as audio and video streams which are transmitted to the player game terminal through a network. The player game terminal does not need to have strong graphics computing and data processing capabilities, but only needs to have a basic streaming media play back capability and a capability of obtaining input instructions from game players and transmitting the instructions to the cloud gaming server. The cloud gaming server may be equipped with a plurality of GPU devices for graphics computing. The GPU is a graphics processing unit which refers to a microprocessor for performing image and graphics associated operations.

For another example, in a video scene, a computer device (such as the server 100) may obtain a virtual scene (such as a cave G with an area light) constructed by a user (such as a video producer, such as a user X2) during video production through a target application client (such as a video production client) on a user terminal (such as the user terminal 200b), then obtain service resource data D2 associated with the cave G, obtain target rendering data E2 for rendering the cave G based on the service resource data D2, obtain a rendered image F2 for displaying the cave G based on the target rendering data E2, and finally return the rendered image F2 to the user terminal 200b to be outputted. It can be understood that the system architecture shown in FIG. 1 may be applied to video production scenes involving area light rendering. For example, the server 100 shown in FIG. 1 may be configured to generate, manage and render virtual scenes. A part of user terminals (such as the user terminal 200a and the user terminal 200b) in the user terminal cluster shown in FIG. 1 may control virtual objects, including actions, expressions and the like of the virtual objects, through a mounted video production client, and the other part of the user terminal (such as the user terminal 200c) in the user terminal cluster may control a virtual camera through the mounted video production client, so that the virtual camera may shoot videos as required. For example, the virtual camera may be controlled to move and shoot between different virtual objects. Furthermore, the rendered image outputted by the server 100 may be displayed in real time through a display device (such as a display of the user terminal 200n) connected to the server 100, thereby reducing the cost of video production and improving the efficiency of video production.

For another example, in an instant messaging scene based on virtual objects, in order to provide a three dimensions (3D) virtual space with link perception and shared features, or an interactive, immersive and collaborative world, a computer device (such as the user terminal 200a) may obtain real environmental data (such as desks, chairs and lighting in a classroom) of the environment (such as a classroom) in which a user (such as a user X3) performs instant messaging through a mounted target application client (such as an instant messaging client), construct a virtual scene associated with the environment (equivalent to a virtual background in an instant messaging process, such as a virtual classroom with an area light) based on the real environmental data, add virtual objects associated with the user X3 to the virtual classroom, then obtain target rendering data E3 for rendering the virtual classroom based on the obtained service resource data D3 associated with the virtual classroom, then obtain a rendered image F3 for displaying virtual objects associated with the virtual classroom and the user X3 based on the target rendering data E3, and output the rendered image F3. The virtual object associated with the user X3 may be a virtual object rendered by the computer device based on the collected real object data of the user X3 (such as the face shape, hairstyle and clothing of the object), or a virtual object selected by the user X3 in advance from an object resource library, which is not limited in the embodiments of this application. It is to be understood that by simulating the lighting effect generated by a real environment in a virtual scene, the sense of reality and immersion of the user may be enhanced, and display modes of instant messaging are enriched based on the virtual objects displayed in the virtual scene.

Figure 2:
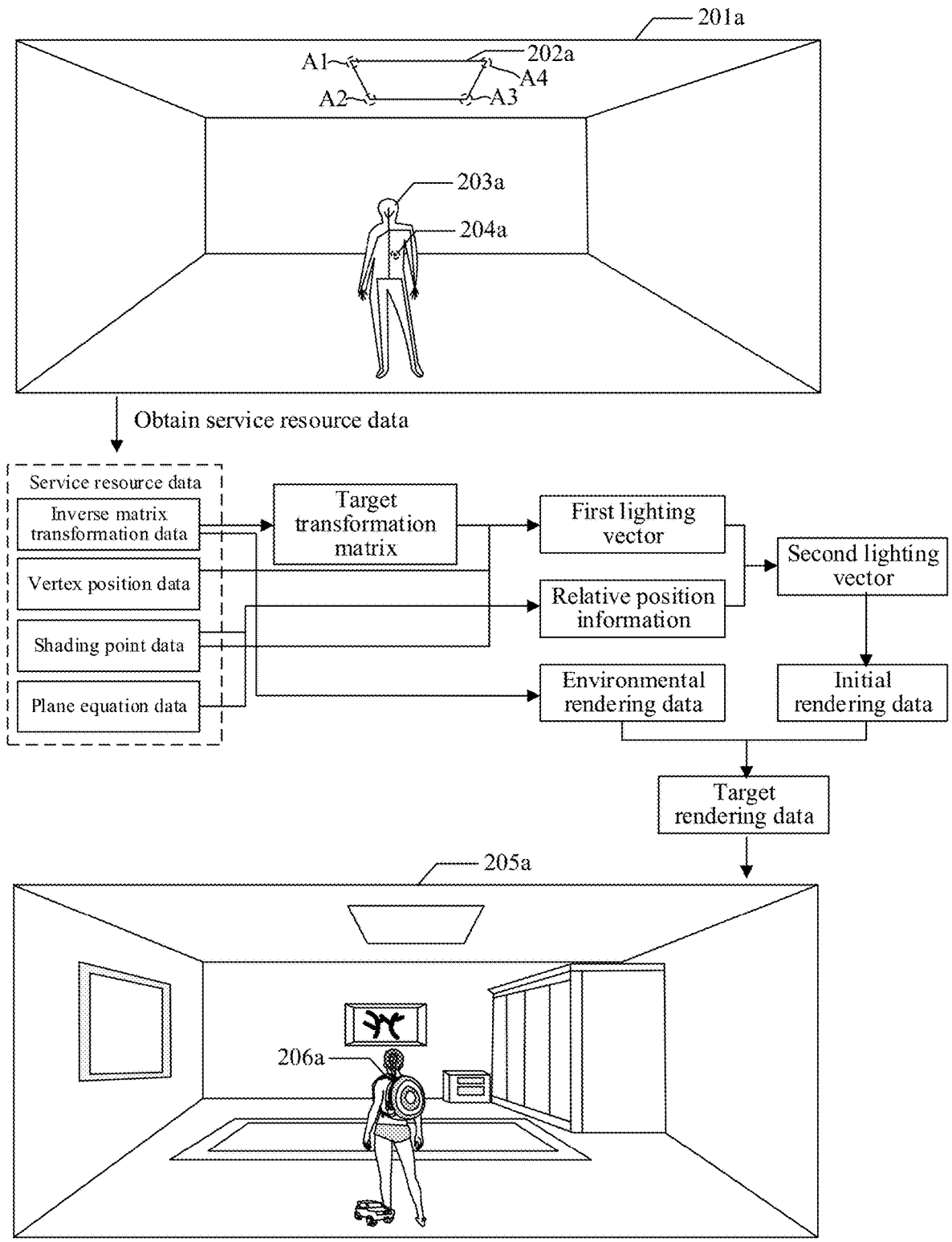
FIG. 2 is a schematic diagram of a scene of data processing provided in an embodiment of this application.

For the convenience of understanding, further, referring to FIG. 2, FIG. 2 is a schematic diagram of a scene of data processing provided in an embodiment of this application. As shown in FIG. 2, the computer device in the embodiment of this application may be a computer device with a rendering function. The computer device may be any user terminal in the user terminal cluster shown in FIG. 1, such as the user terminal 200a. The computer device may also be the server 100 shown in FIG. 1. The computer device is not limited here.

As shown in FIG. 2, the computer device may obtain a virtual scene (such as a virtual scene 201a) constructed in advance. The virtual scene may include a virtual space as well as virtual articles and virtual objects in the virtual space. At this time, the entire virtual scene is in a state to be rendered. For example, taking a virtual object 203a in the virtual scene 201a as an example, at this time, the virtual object 203a is in a state to be rendered, so the presented virtual object 203a may be understood as an unshaded virtual object model. It can be understood that when the virtual scene contains an area light (such as an area light 202a), the computer device may obtain service resource data associated with the virtual scene, where the service resource data may include shading point data, inverse matrix transformation data, vertex position data and plane equation data associated with the area light. It is to be understood that the foregoing area light may include three or more vertices (such as four vertices). The number of vertices contained in the area light is not limited in the embodiments of this application. Taking the area light 202a as an example, assuming that the area light 202a is a quadrilateral area light, that is, the area light 202a contains four vertices, namely a vertex A1, a vertex A2, a vertex A3 and a vertex A4, the vertex position data obtained by the computer device may specifically include position data of the vertex A1, position data of the vertex A2, position data of the vertex A3 and position data of the vertex A4, and the plane equation data may include a plane normal vector of a plane where the area light 202a is located and a light distance between an origin in a world coordinate system where the virtual scene 201a is located and the plane.

It is to be understood that the shading point may be any point in the virtual scene, so by shading all shading points in the virtual scene, the rendering of the virtual scene may be achieved. Taking a shading point 204a as an example, the shading point 204a may be any point in the virtual scene 201a, for example, the shading point 204a may be a shading point on the virtual object 203a, so the foregoing shading point data may include position data of the shading point 204a. Correspondingly, the foregoing inverse matrix transformation data may contain a normal vector, a view vector and roughness associated with the shading point 204a.

Further, as shown in FIG. 2, after obtaining the foregoing service resource data, the computer device may generate target rendering data for rendering the virtual scene based on the service resource data. In other words, the computer device may shade each shading point in the virtual scene based on the target rendering data, thereby presenting the lighting effect of the area light on the virtual scene in the outputted rendered image. Specifically, first, the computer device may generate a target transformation matrix based on the inverse matrix transformation data, then, projectively transform the vertices (such as the vertex A1, the vertex A2, the vertex A3 and the vertex A4) of the area light onto a spherical surface of a unit sphere where the shading point is located through the target transformation matrix, the shading point data and the vertex position data, and subsequently, generate vectors associated with the area light based on the vertices projectively transformed onto the spherical surface, thereby determining relative position information between the shading point of first lighting corresponding to the shading point data and the area light based on the plane equation data and the shading point data, and then obtaining a second lighting vector based on the relative position information and the foregoing first lighting vector. Further, the computer device may generate target rendering data for rendering the virtual scene based on the initial rendering data of the area light (that is, the highlight terms of the area light) determined by the second lighting vector and the environmental rendering data of the virtual scene (that is, the highlight terms of the environmental light) determined by the inverse matrix transformation data. For specific implementations here, reference may be made to the subsequent embodiments corresponding to FIG. 3 to FIG. 11. The environmental light may be some low-frequency lights in a virtual scene. The light information from all directions of the virtual scene (direct light and indirect light are not distinguished here) may be recorded to obtain the environmental light. It can be understood that an object may also be rendered by the environmental light to reflect the surrounding environment on the surface of the object. In addition, due to very low cost, environmental light rendering is very useful for mobile applications. Taking the shading point 204a as an example, the target rendering data corresponding to the shading point 204a may be obtained through the process described above, so the computer device may shade the shading point 204a based on the target rendering data. The process of obtaining the target rendering data corresponding to other shading points and shading the shading points is the same as the process of the shading point 204a, so the other shading points are not described herein again.

As shown in FIG. 2, finally, after the computer device shades each shading point in the virtual scene based on the generated target rendering data, a rendered image (such as a rendered image 205a) associated with the virtual scene may be outputted. It can be understood that in the rendered image 205a, the lighting effects of the area light 202a on all virtual objects and virtual articles in the virtual scene 201a may be presented. For example, after the virtual object 203a is shaded, a shaded virtual object 206a may be obtained; since the virtual object 203a is located on the front face of the area light 202a, that is, the virtual object 203a is located in an illumination region of the area light 202a, the virtual object 203a will inevitably reflect accordingly, resulting in a visually brighter virtual object 206a; and the brightness corresponding to some regions that are not illuminated by the area light 202a in the virtual scene 201a (such as the corner of a wall obscured by a wardrobe) is relatively dark, so the regions may be presented as shadow regions in the rendered image 205a.

It can be understood that with the continuous change in service resource data, the target rendering data generated by the computer device is also continuously updated, so that the rendered image associated with the virtual scene is also changed accordingly so as to achieve real-time rendering based on the area light. For example, for the same shading point, when view vectors are different, the observed pictures are also different.

It can be seen from the above that in the embodiments of this application, in the process of solving the integration of the area light (for example, generating a first lighting vector), horizon clipping is not considered. As a result, the number of instructions required for the entire rendering process may be effectively reduced, and the occupation of memory resources (such as register resources) of the computer device may be reduced, thereby improving the rendering efficiency.

Figure 3:
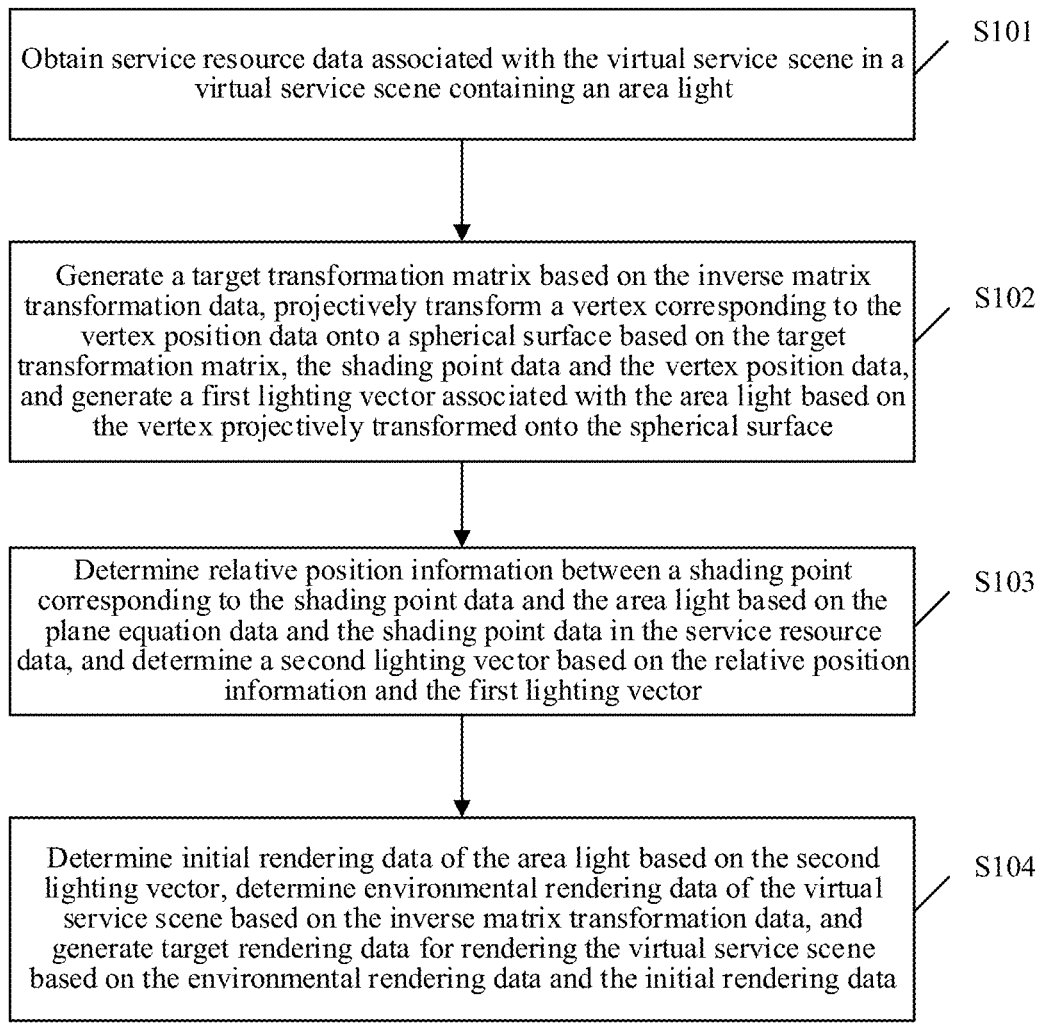
FIG. 3 is a schematic flowchart of a data processing method provided in an embodiment of this application.

Further, referring to FIG. 3, FIG. 3 is a schematic flowchart of a data processing method provided in an embodiment of this application. As shown in FIG. 3, the method may be performed by a computer device with a rendering function (such as a device integrated with one or more GPUs). The computer device may be a user terminal (such as the user terminal 200a shown in FIG. 1) or a server (such as the server 100 shown in FIG. 1), which is not limited herein. For the convenience of understanding, the embodiment of this application takes the method performed by a server as an example for explanation. The method may at least include the following steps S101 to S104:

Step S101: Obtain service resource data associated with the virtual scene in a virtual scene containing an area light.

Specifically, the computer device may obtain a virtual scene constructed in advance and detect whether there is an area light in the virtual scene. If it is detected that there is an area light in the virtual scene, the computer device may obtain service resource data associated with the virtual scene in the virtual scene containing the area light, where the service resource data may include shading point data, inverse matrix transformation data, vertex position data and plane equation data associated with the area light.

It is to be understood that virtual scenes may be constructed by a designer according to service requirements. For example, for a virtual game, various virtual scenes such as vehicles, buildings, canyons and forests may be constructed to enrich the game content. The specific content contained in virtual scenes is not limited in the embodiments of this application. The area light may be a light independent of a virtual scene or a virtual article in a virtual scene, which is not limited in the embodiments of this application. In a practical application, the designer may select whether an area light is visible in a virtual scene. For example, an area light may be directly displayed in a virtual scene, or an area light may be hidden in a virtual scene, but the action of the area light still needs to be considered during rendering.

In some embodiments, if it is detected that there is no area light in the virtual scene, the computer device may skip the step of solving the integration of the area light in the embodiment of this application, but may determine environmental rendering data of the virtual scene based on the inverse matrix transformation data, and subsequently generate target rendering data for rendering the virtual scene based on the environmental rendering data.

Step S102: Generate a target transformation matrix based on the inverse matrix transformation data, projectively transform a vertex corresponding to the vertex position data onto a spherical surface based on the target transformation matrix, the shading point data and the vertex position data, and generate a first lighting vector associated with the area light based on the vertex projectively transformed onto the spherical surface.

For the convenience of understanding, in the embodiment of this application, first, relevant theoretical parts of linearly transformed cosines (LTC) are briefly introduced, and then, the specific method provided in the embodiment of this application is described in detail. The following conclusions exist in LTC: by applying a transformation matrix M (which may be abbreviated as an M matrix, such as a 3×3 matrix) to a spherical function Do(ωo), a new spherical function D(ω) will be obtained, meeting the following properties:

$$D(\omega) = D_o(\omega_o)\frac{\partial \omega_o}{\partial \omega}, \quad (1)$$

$$\int_P D(\omega)d\omega = \int_{P_o} D_o(\omega_o)d\omega_o, \quad (2)$$

where $$\omega_o = \frac{M^{-1}\omega}{\|M^{-1}\omega\|}, \quad (3)$$

$$\frac{\partial \omega_o}{\partial \omega} = \frac{|M^{-1}|}{\|M^{-1}\omega\|^3}, \quad (4)$$

where ω and ωo respectively represent a solid angle, that is, the expansion of a plane angle on a sphere. The application of the foregoing conclusions in solving the integration of the area light is: if there is an analytical solution for integrating a polygon with a spherical function $D_o(\omega_o)$, a transformation matrix M is found to transform $D_o(\omega_o)$ into $D(\omega) \approx f_r(V, \omega)$, then a polygon P may be transformed into Po through the inverse transformation of the transformation matrix M, namely an M-1 matrix, and the purpose of approximately solving $\int_P f_r(V, \omega)d\omega$ may be achieved by solving $\int_{P_o} D_o(\omega_o)d\omega_o$, where V represents a view vector, and $f_r$ represents a BRDF. $D_o(\omega_o)$ may be any spherical function, and it only needs to ensure that the function may perform integration and importance sampling of a polygon. Spherical Harmonics or Clamped Cosine (the subsequent Cosine is equivalent to the Clamped Cosine) may be selected. In consideration of performance, the Cosine function is used in the embodiment of this application.

The integration of the spherical Cosine function on a polygon is:

$$\frac{1}{\pi}\int_P \cos(\omega)d\omega \quad (5)$$

At this time, there is the following analytical solution:

$$E(p_1, \ldots, p_n) = \frac{1}{2\pi}\sum_{i=1}^{n} \arccos\langle p_i, p_j\rangle \left\langle \frac{p_i \times p_j}{\|p_i \times p_j\|}, \begin{bmatrix}0\\0\\1\end{bmatrix}\right\rangle, \quad (6)$$

where j=i+1, the vertex $p_i$ is a projection of the $i^{th}$ vertex of the polygon P on a unit sphere, $p_i \times p_j$ may obtain a cosine value of an included angle between a vector pointing from the origin to the vertex $p_i$ and a vector pointing from the origin to the vertex $p_j$, and the result of $$\frac{p_i \times p_j}{\|p_i \times p_j\|}$$

may represent a unit vector orthogonal to the foregoing two vectors. It can be understood that the analytical solution is the initial rendering data of the area light that needs to be obtained through a series of computations in the subsequent implementation of this application.

Further, a hemispherical function $D_o(\omega_o)=\cos(\omega_o)$ may be transformed through a transformation matrix M in the following form to achieve the fitting of the Microfacet BRDF.

$$M = \begin{bmatrix} m00 & 0 & m02 \\ 0 & m11 & 0 \\ m20 & 0 & m22 \end{bmatrix} \quad (7)$$

Therefore, the solving objective in the embodiment of this application is to optimize the following function to minimize the error between D(ω) and $f_r(V, \omega)$.

$$\int_\Omega (D(\omega) - f_r(V, \omega))^2 d\omega = \int_\Omega \left(D_o\left(\frac{M^{-1}\omega}{\|M^{-1}\omega\|}\right)\frac{|M^{-1}|}{\|M^{-1}\omega\|^3} - f_r(V, \omega)\right)^2 d\omega \quad (8)$$

To facilitate the understanding of the transformation matrix M, first, it is necessary to understand the geometric meanings of five variables (m00, m02, m11, m20 and m22) in Formula (7).

Figure 4A:
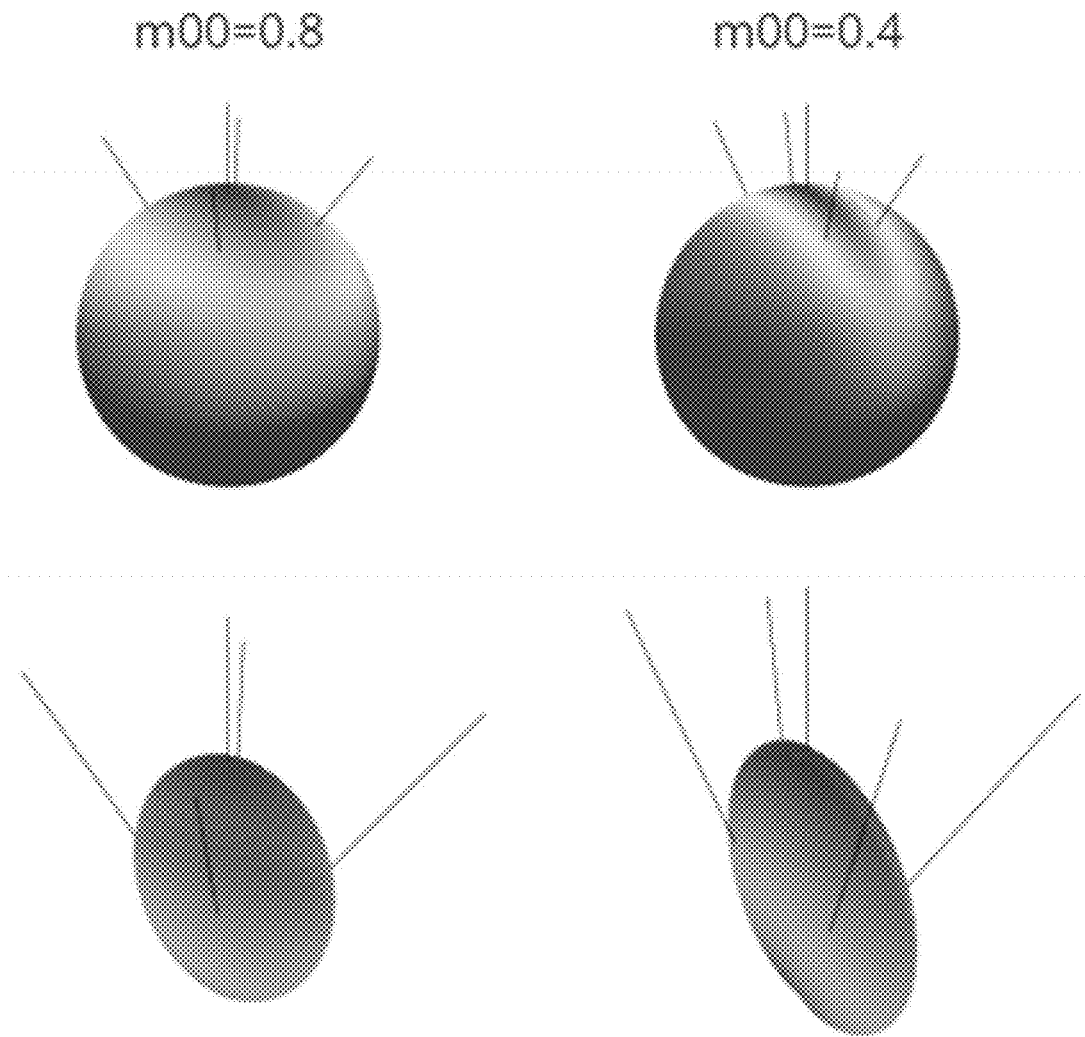
FIG. 4A through 4C is a geometric schematic diagram of variables provided in an embodiment of this application.
Figure 4B:
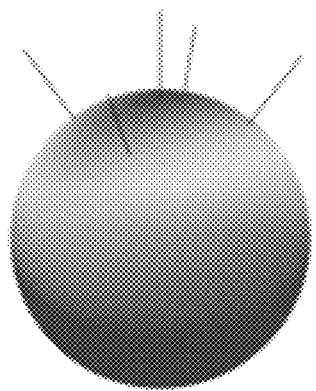
Figure 4B:
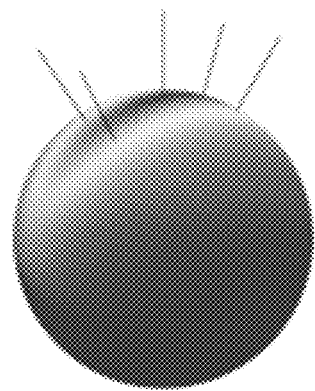
Figure 4B:
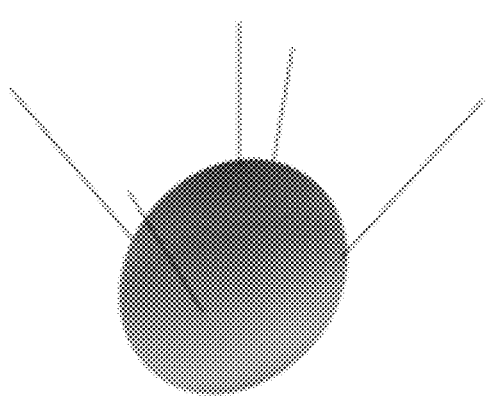
Figure 4B:
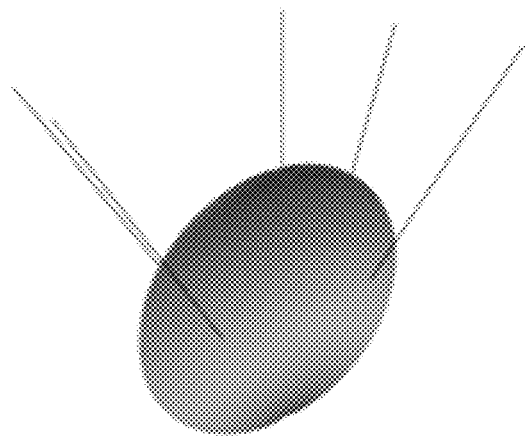
Figure 4C:
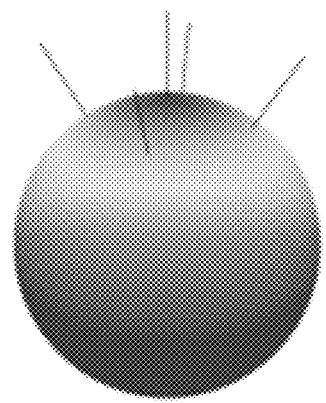
Figure 4C:
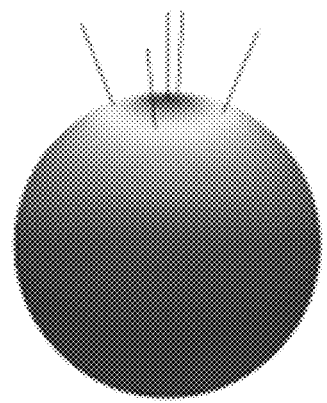
Figure 4C:
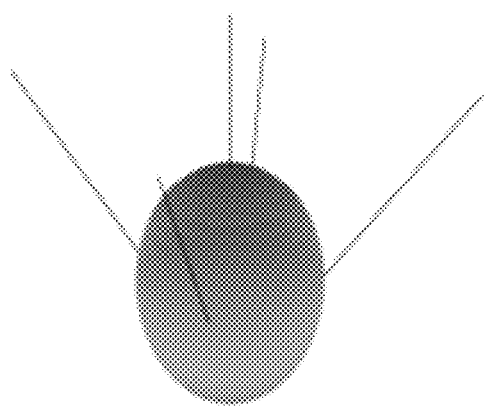
Figure 4C:
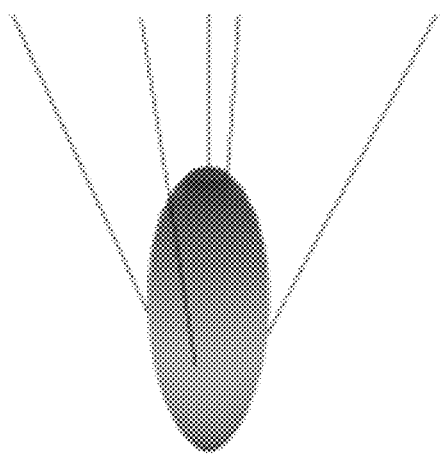

Referring to FIG. 4A through 4C, FIG. 4A through 4C is a geometric schematic diagram of variables provided in an embodiment of this application. As shown in FIG. 4A through 4C, by comparing the spherical representation at m00=0.8 and the spherical representation at m00=0.4, it can be intuitively observed that m00 represents scaling about an X axis; similarly, by comparing the spherical representation at m11=0.8 and the spherical representation at m11–0.4, it can be intuitively observed that m11 represents scaling about a Y axis; and similarly, by comparing the spherical representation at m22=1.2 and the spherical representation at m22=2.0, it can be intuitively observed that m22 represents scaling about a Z axis.

Figure 5A:
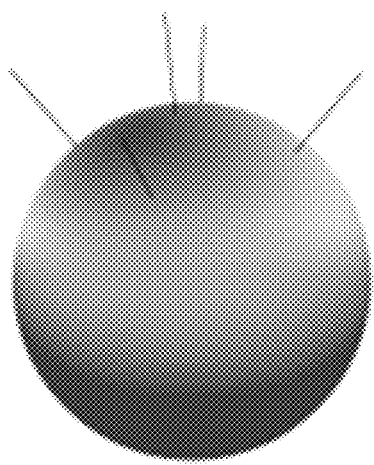
FIG. 5A through 5C is a geometric schematic diagram of variables provided in an embodiment of this application.
Figure 5A:
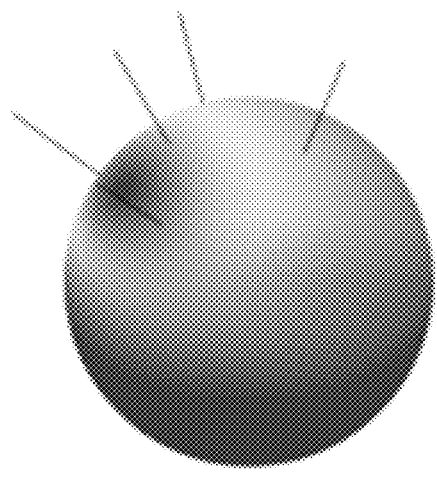
Figure 5A:
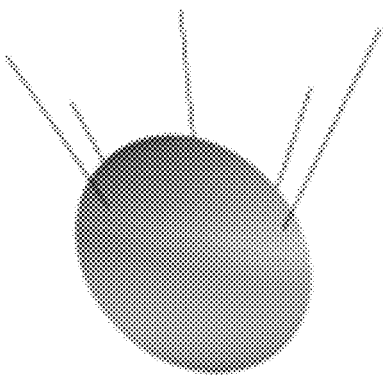
Figure 5A:
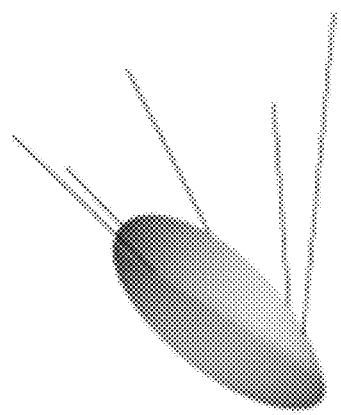
Figure 5B:
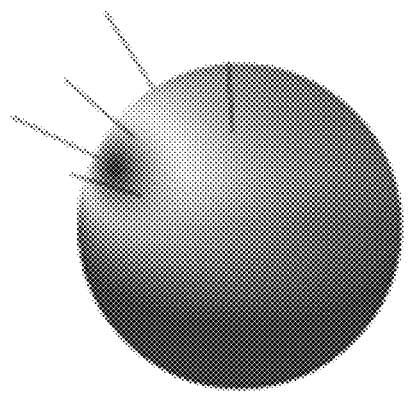
Figure 5B:
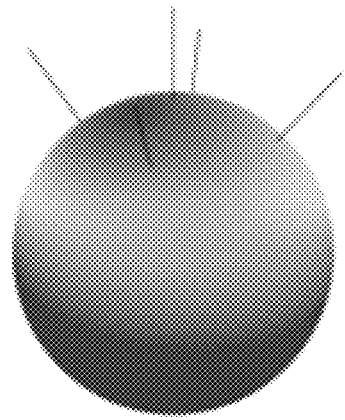
Figure 5B:
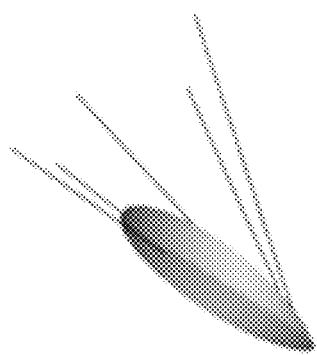
Figure 5B:
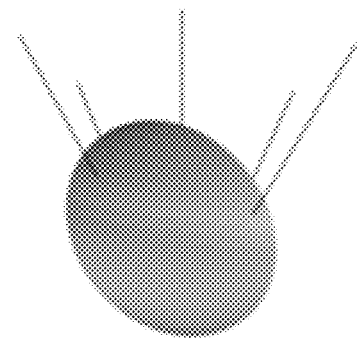
Figure 5C:
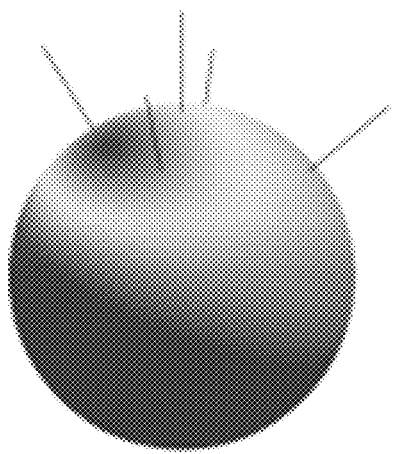
Figure 5C:
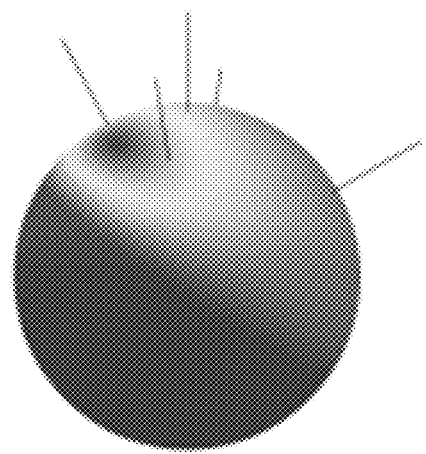
Figure 5C:
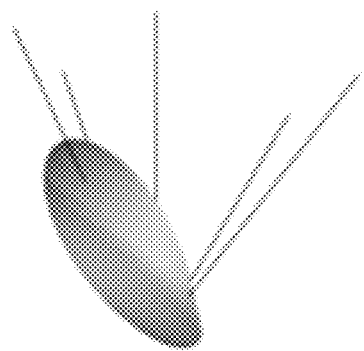
Figure 5C:
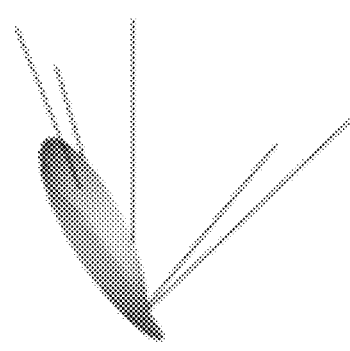

Similarly, referring to FIG. 5A through 5C, FIG. 5A through 5C is a geometric schematic diagram of variables provided in an embodiment of this application. As shown in FIG. 5A through 5C, by comparing the spherical representation at m02=0.1, the spherical representation at m02=0.5 and the spherical representation at m02=0.9, it can be intuitively observed that m02 represents rotation on a ZX plane. Similarly, by comparing the spherical representation at m20=0.1, the spherical representation at m20=0.5 and the spherical representation at m20=0.9, it can be intuitively observed that m20 represents an offset on the ZX plane.

However, even with the intuitive understanding of the foregoing five variables, it is still too difficult to directly solve the 5D optimization problem in Formula (8), so it is necessary to further reduce the complexity of the problem. First, the optimization problem may be simplified by using a Phong BRDF (a reflection model, abbreviated as Phong) instead of a GGX BRDF (a lighting model, abbreviated as GGX) commonly used in games. In the case of Phong, the Cosine function may be approximated to Phong through a scaling matrix and a rotation matrix, where the Z axis of the rotation matrix is a reflection vector. In addition, due to the symmetry of the Phong model relative to the reflection vector, the m00 and m11 of the scaling matrix are equal. At this time, the problem is simplified to a single variable optimization problem which is easy to solve. It is to be understood that in the embodiment of this application, the product of the scaling matrix and the rotation matrix may be equivalent to the foregoing transformation matrix M.

Figure 6:
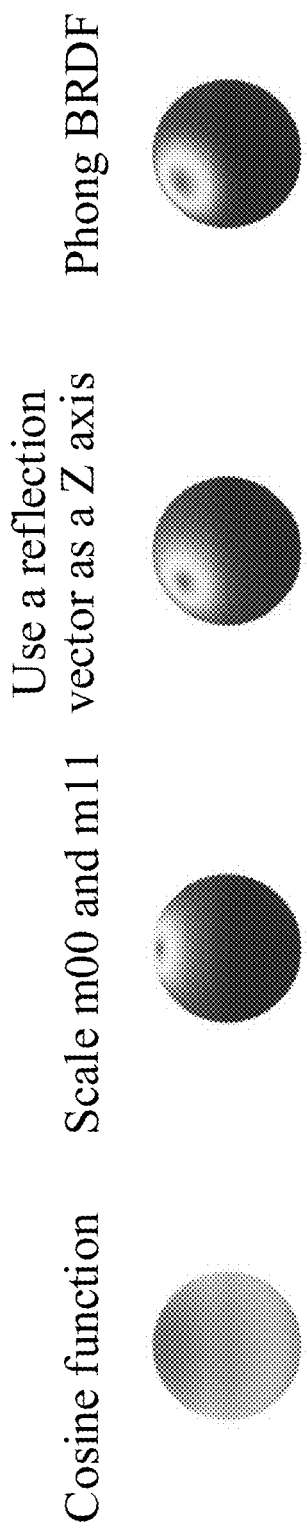
FIG. 6 is a schematic diagram of a process of fitting Phong by using LTC provided in an embodiment of this application.

FIG. 6 is a schematic diagram of a process of fitting Phong by using LTC provided in an embodiment of this application. FIG. 6 shows rotation and scaling processes when an included angle between a view vector and a normal vector is 30 degrees and the roughness of an object surface is 0.6. As shown in FIG. 6, first, a cosine function may be scaled through m00 and m11, and then, the corresponding reflection vector is used as a Z axis to obtain a function which may be used for fitting the Phong BRDF. The objective function described in Formula (8) may be used as a loss function, and the optimization problem may be solved by scipy.optimize.minimize.

Figure 7:
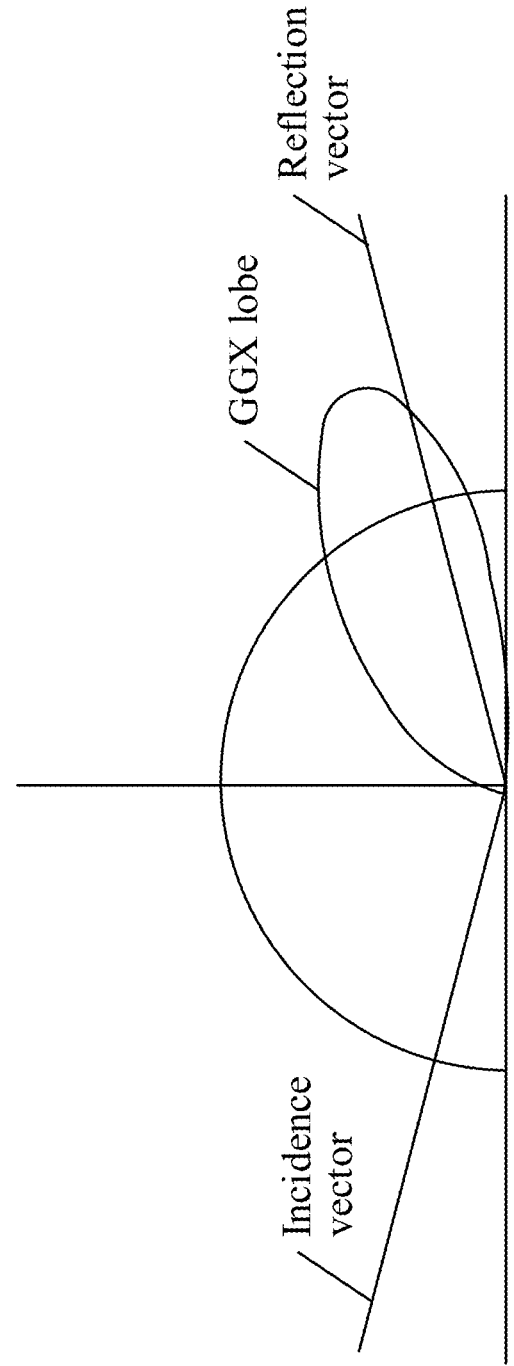
FIG. 7 is a geometric schematic diagram of GGX reflection provided in an embodiment of this application.

Based on the foregoing descriptions, it is considered that the Phong model is replaced with GGX. GGX has two differences in the shape of the BRDF compared to Phong:

(1) The shape of GGX projected on a spherical surface is an ellipsoid, which may be approximated by applying different scaling coefficients to m00 and m11.
(2) There is a certain offset between the main direction of GGX reflection and the reflection vector. For the convenience of intuitive understanding, referring to FIG. 7, FIG. 7 is a geometric schematic diagram of GGX reflection provided in an embodiment of this application. As shown in FIG. 7, there is a certain offset between the main direction of reflection indicated by a GGX lobe and the reflection vector. This phenomenon is called "Off-specular peak" (which may be translated as reflection beyond the scope of specular reflection). In the application of image based lighting, approximation of this phenomenon may be achieved. In the case of LTC, this phenomenon is consistent with the intuitive understanding of the variable m02 described above, which may be approximated by modifying m02.

In addition, in the process of fitting, in order to provide a better initial value, the embodiment of this application may use a pre-step to compute the main direction of the BRDF, and use this main direction as the Z axis of the LTC rotation matrix. Code examples corresponding to this process are as follows:

```
// v is a view vector, and linear_roughness is roughness
def ggx_dominant_direction(v, linear_roughness):
    num_samples = 2048
    // Create 2048 theta samples, where theta is an included angle with the Z axis
    theta = np.linspace(-np.pi/2, np.pi/2, num_samples)
    // Obtain a spherical direction wi according to the theta angle, where phi is a rotation angle in the XY plane
    wi = spherical_dir(theta, phi)
    // Obtain values of a GGX BRDF according to the view vector v and the spherical direction wi
    values = ggx_brdf(linear_roughness, v, wi)
    // Sort the results of the GGX BRDF in descending order to obtain index values
    ind = np.argmax(values, axis=None)
    // Sort spherical vectors according to the index values, and sort the obtained results in descending order according to the values of the GGX BRDF
    return np.array([wi.x[ind], wi.y[ind] * 0, wi.z[ind]])
```

Figure 8:
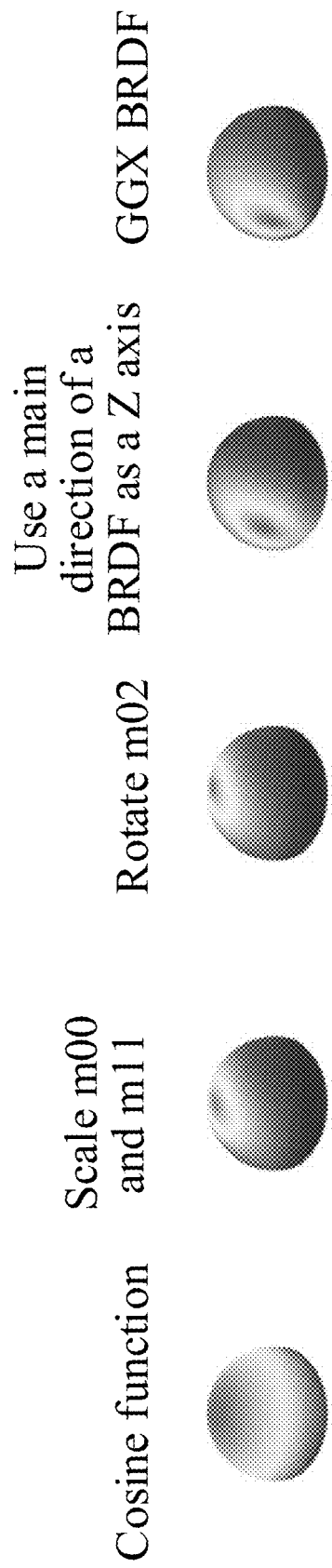
FIG. 8 is a schematic diagram of a process of fitting GGX by using LTC provided in an embodiment of this application.

As can be seen from the above, the LTC approximation problem of GGX may still be solved by the same idea as Phong, where the Z axis of the rotation matrix is the main direction of the GGX BRDF, and the scaling matrix needs to be scaled using m00 and m11 and rotated in the ZX plane using m02. Referring to FIG. 8, FIG. 8 is a schematic diagram of a process of fitting GGX by using LTC provided in an embodiment of this application. As shown in FIG. 8, a cosine function may be first scaled through m00 and m11 and then rotated in the ZX plane through m02, so the main direction of the GGX BRDF may be used as a Z axis to obtain a function which may be used for fitting the GGX BRDF. Similar to the fitting of Phong mentioned above, scipy.optimize.minimize may also be used for optimization. However, the 1D optimization problem in a Phong scene is extended to the 3D optimization problem in a GGX scene, which is still much simpler than direct solution of the 5D optimization problem at the beginning. In addition, for the initial value of the optimization problem, the result of the previous optimization will be used as the input for the next iteration to ensure the continuity of results.

Through the solving process described above, the m00, m11 and m02 of the scaling matrix may be obtained. However, in a game scene, due to the inability to accurately compute the main direction of the GGX BRDF during game running, the foregoing transformation matrix M may not be restored through the three variables, and an inverse matrix of the transformation matrix M, namely an M-1 matrix, needs to be used during running. If the M-1 matrix is directly saved, 5 variables need to be stored, and correspondingly, the mapping lookup operation (that is, the table lookup operation) needs to be performed twice. If the number of variables is controlled within 4, the table lookup operation only needs to be performed once. In combination with an analytical expression of a spherical function D in LTC:

$$D(\omega) = D_o(\omega_o) \frac{\partial \omega_o}{\partial \omega} = D_o \left( \frac{M^{-1}\omega}{\|M^{-1}\omega\|} \right) \frac{|M^{-1}|}{\|\|M^{-1}\omega\|^3} \quad (9)$$

By analyzing the analytical expression in Formula (9), it can be concluded that by replacing M-1 in Formula (9) with 2IM-1, Formula (9) is still workable, where 2, is a constant, and I is a unit matrix. The corresponding expression is as follows:

$$D(\omega) = D_o \left( \frac{\lambda I M^{-1}\omega}{\|\lambda I M^{-1}\omega\|} \right) \frac{|\lambda I M^{-1}|}{\|\lambda I M^{-1}\omega\|^3} \quad (10)$$

$$= D_o \left( \frac{M^{-1}\omega}{\|M^{-1}\omega\|} \right) \frac{|\lambda I||M^{-1}|}{\lambda^3 \|M^{-1}\omega\|^3}$$

$$= D_o \left( \frac{M^{-1}\omega}{\|M^{-1}\omega\|} \right) \frac{\lambda^3 |M^{-1}|}{\lambda^3 \|M^{-1}\omega\|^3}$$

Figures 1, 9A:
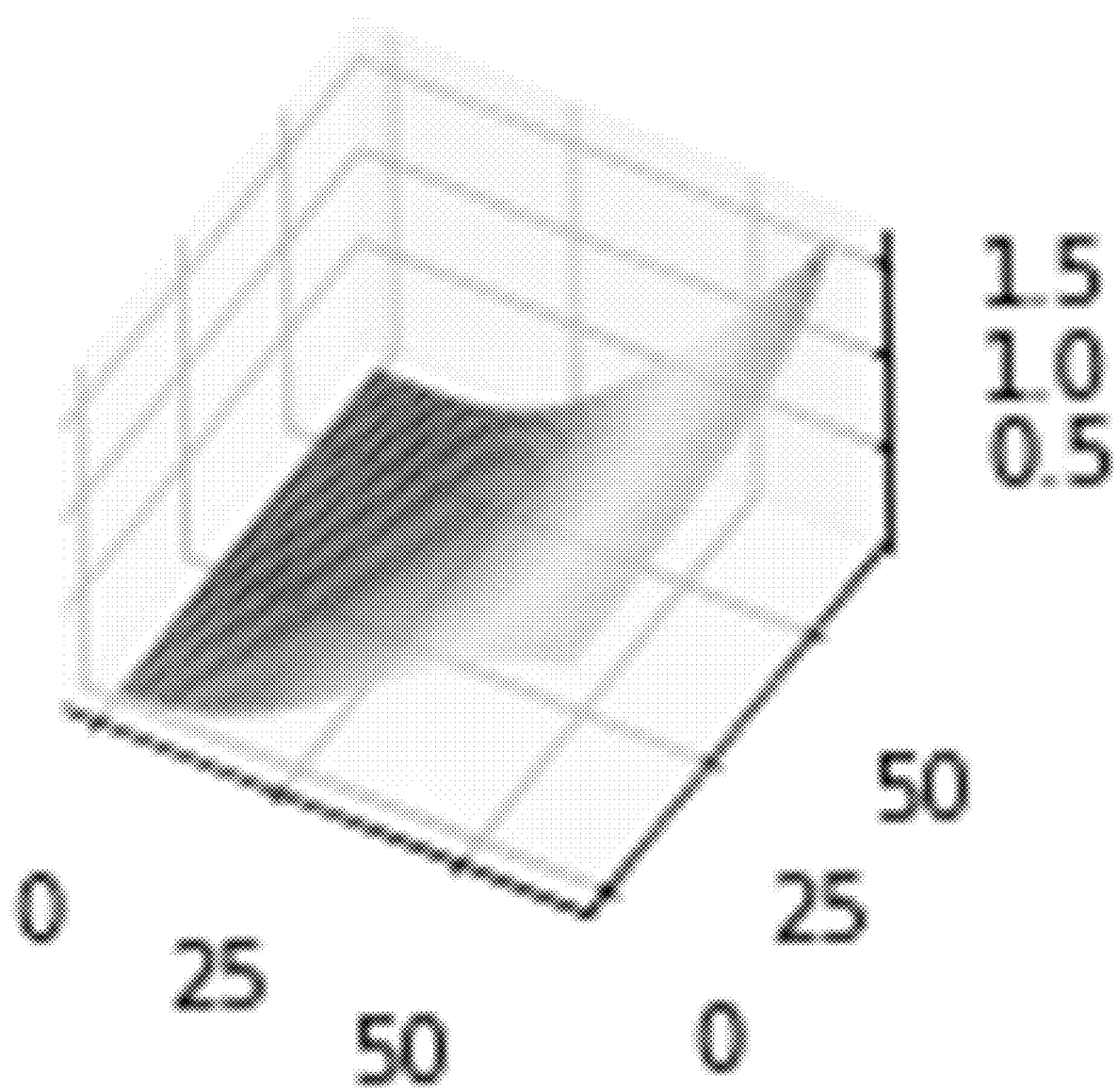
Figures 2, 9A:
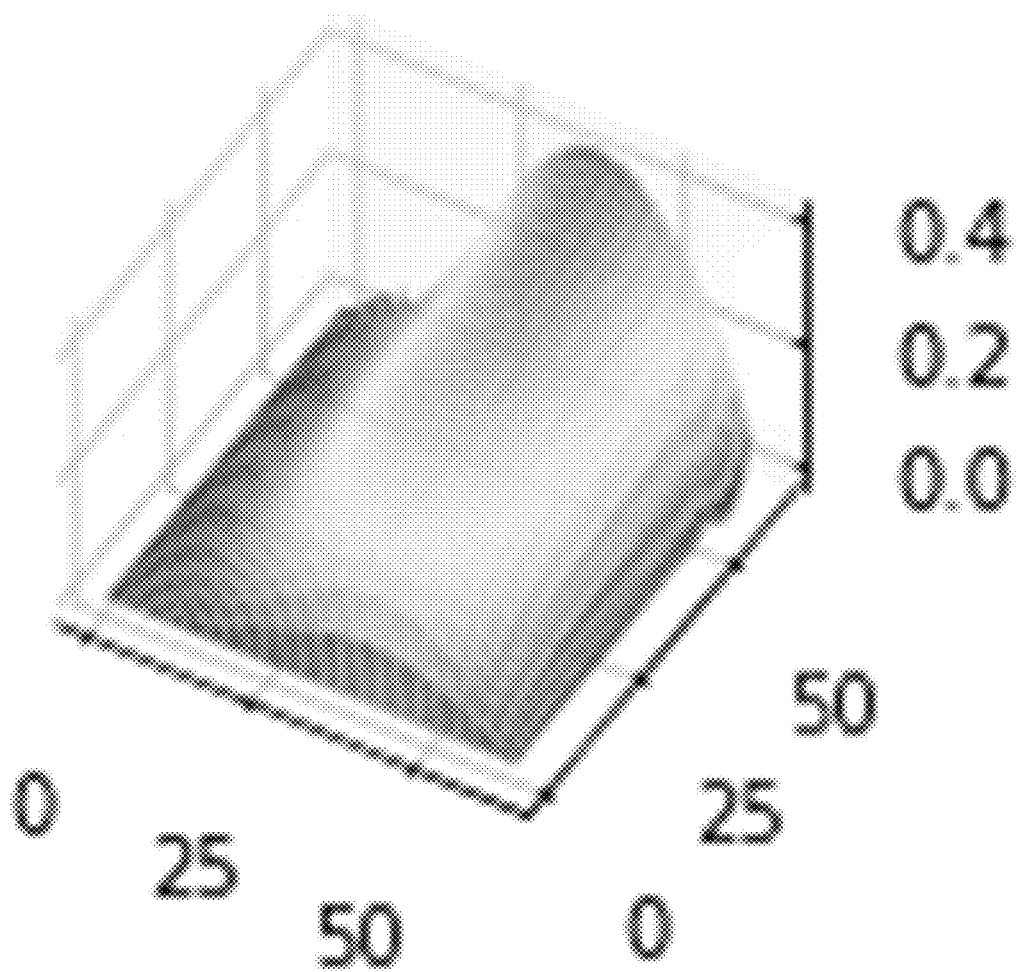
Figures 3, 9A:
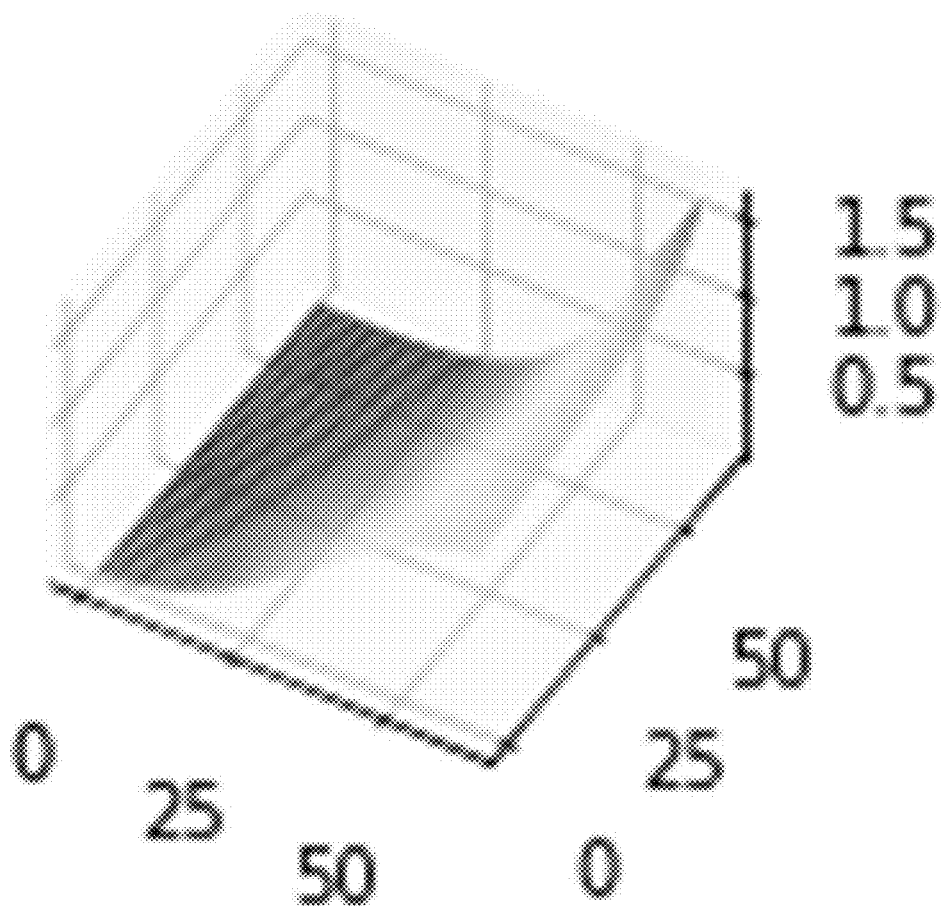
Figures 4, 9A:
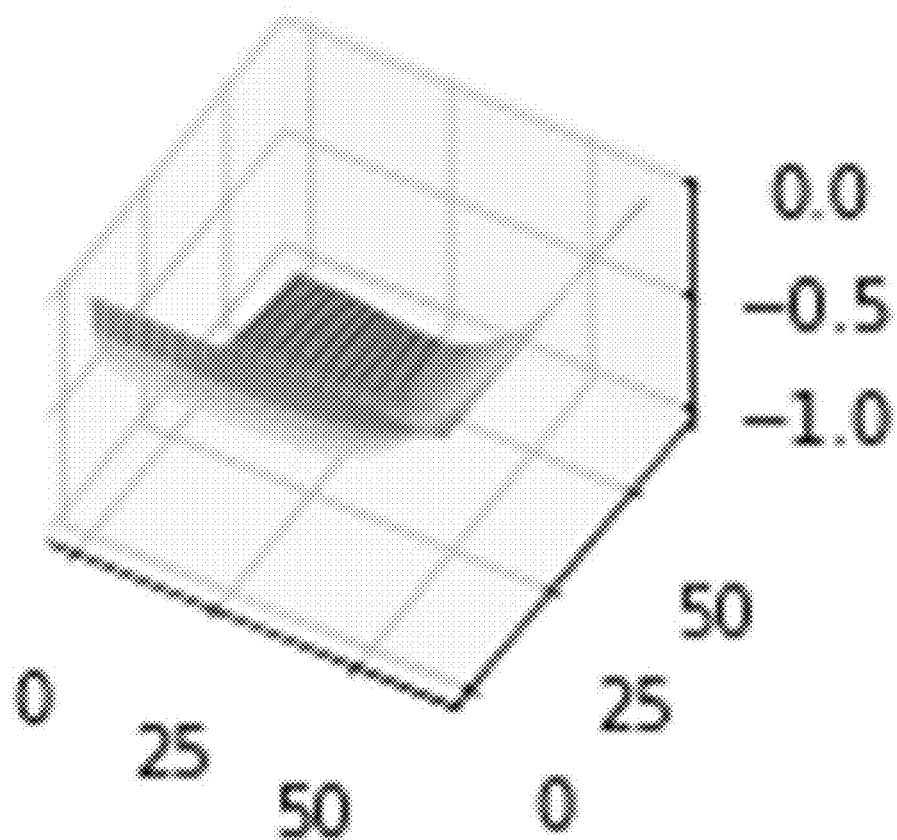
Figures 5, 9A:
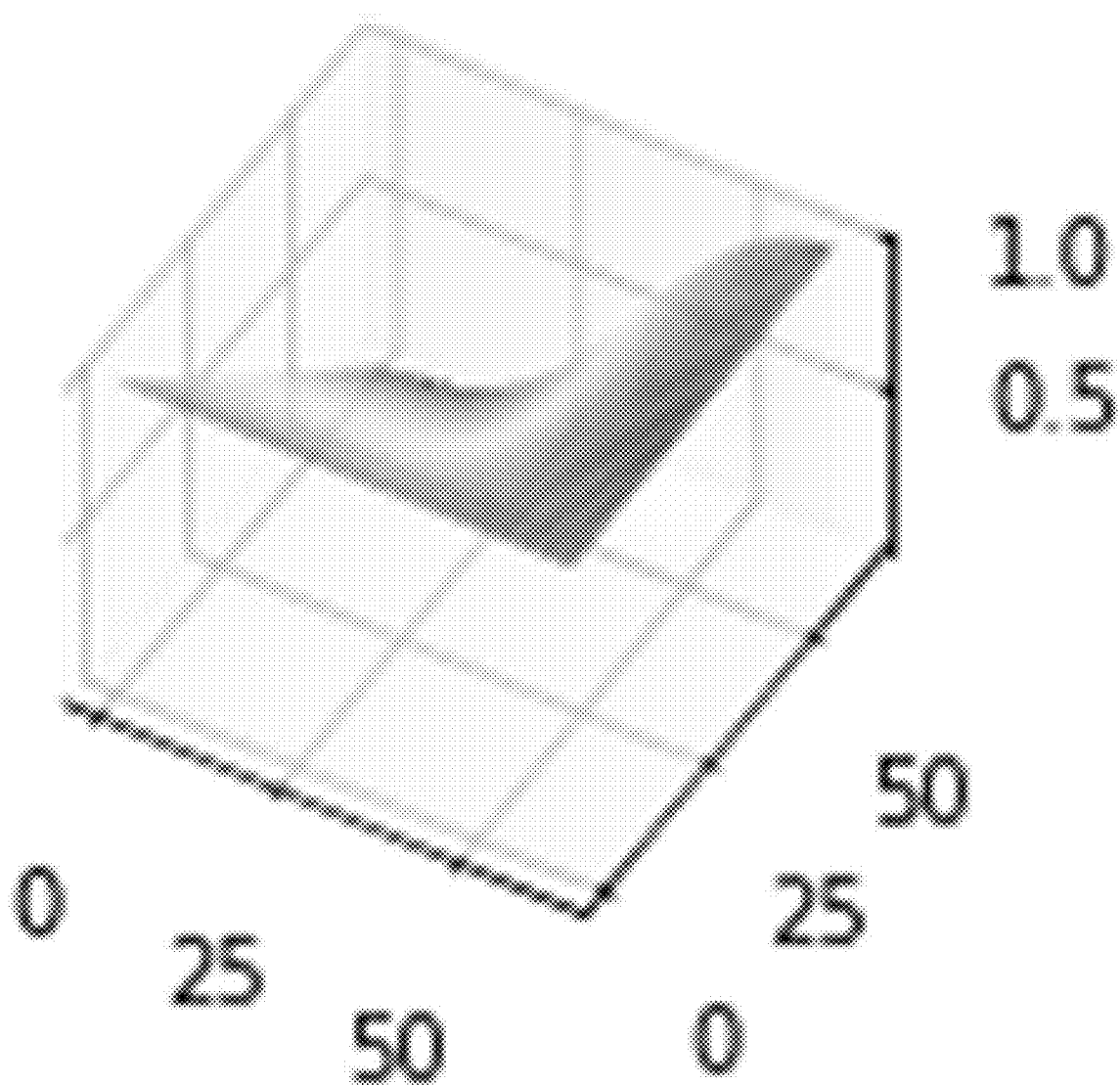
Figures 1, 9B:
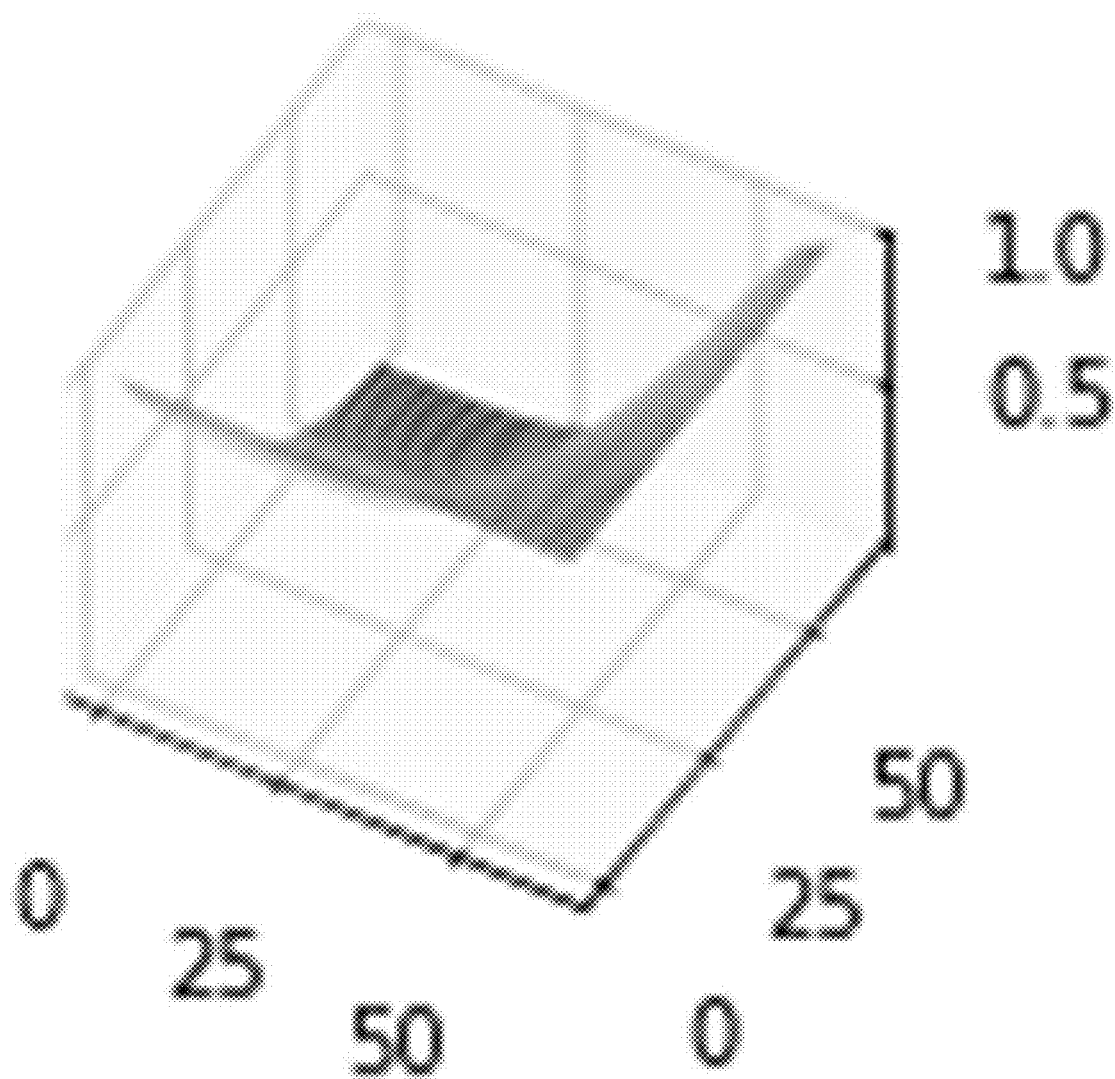
Figures 2, 9B:
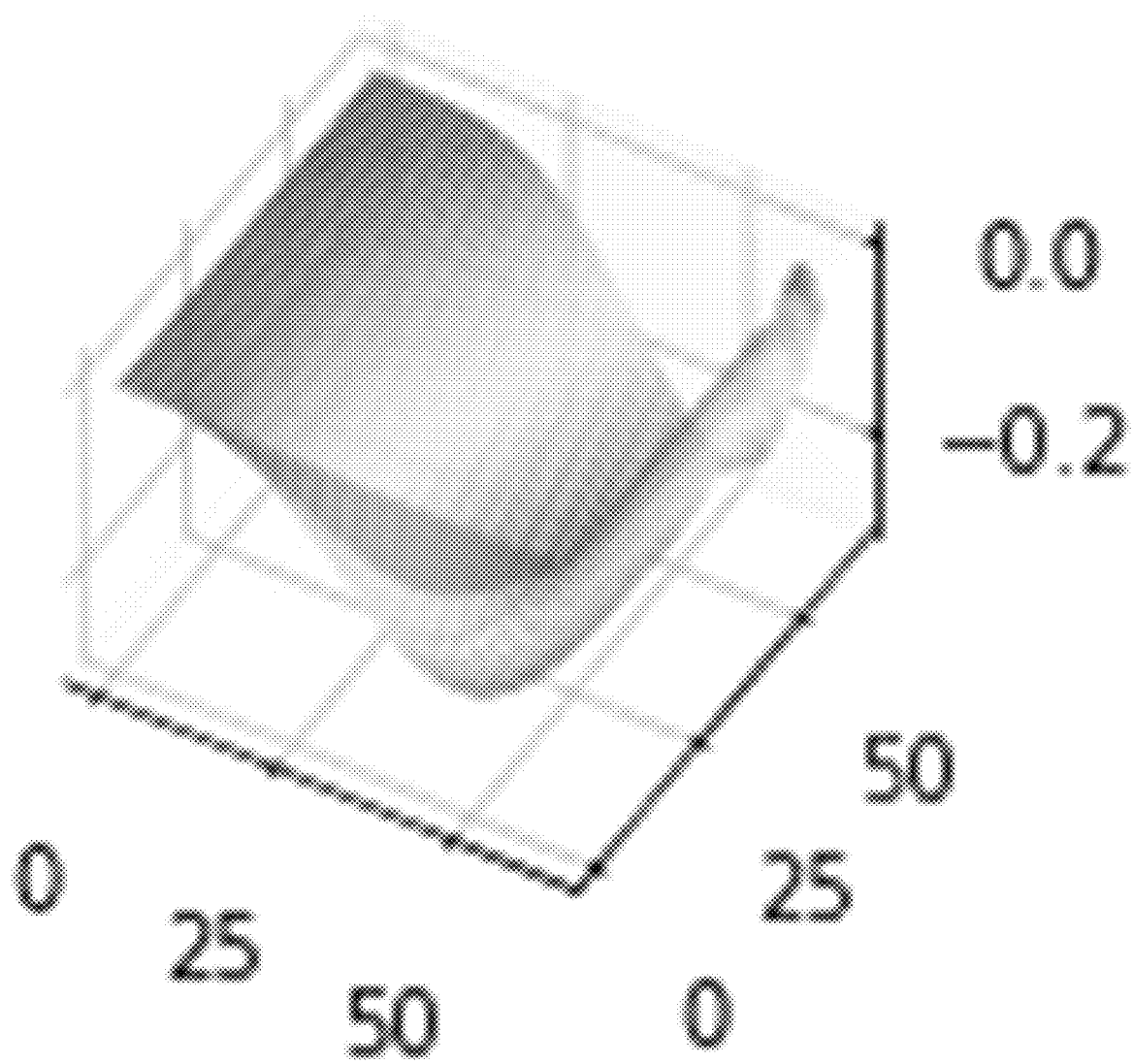
Figures 3, 9B:
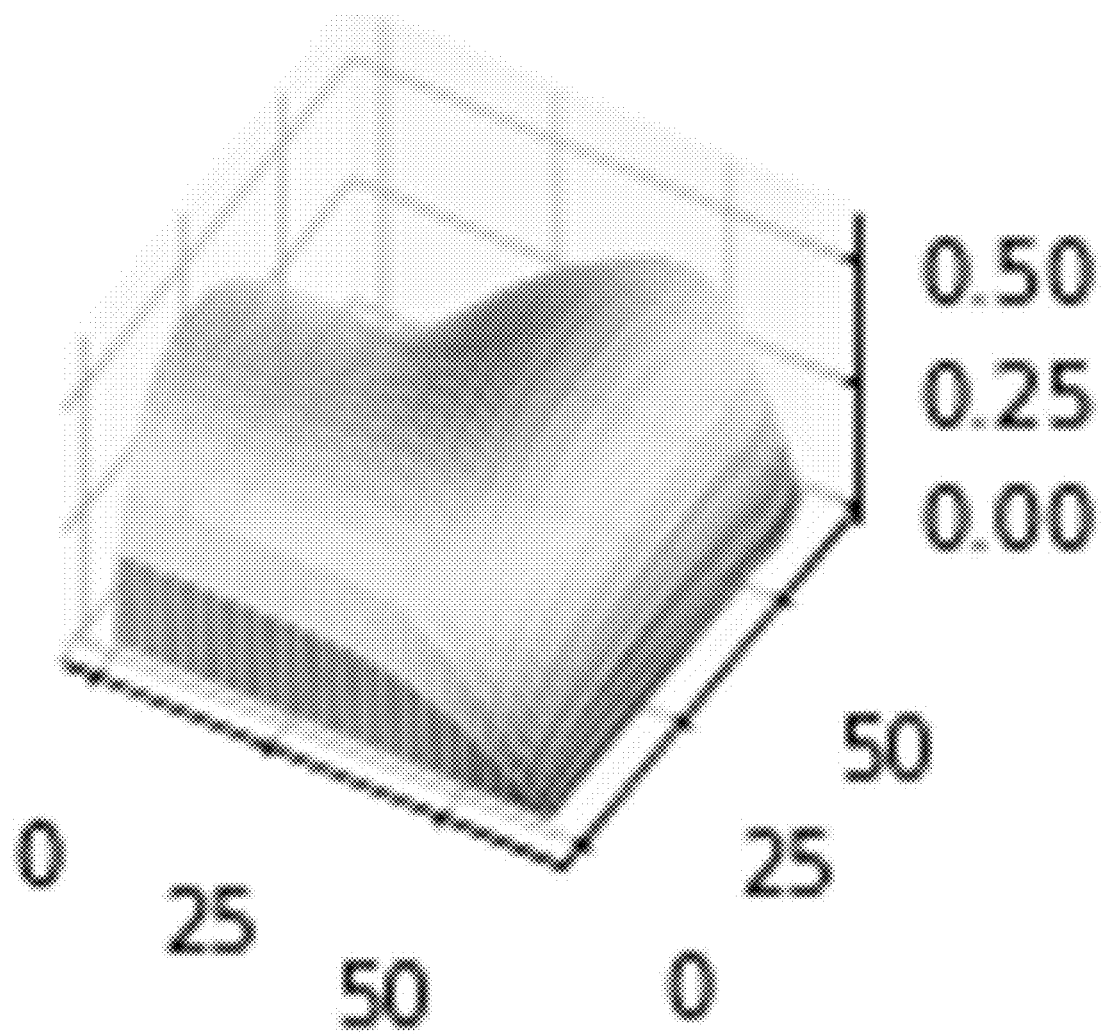
Figures 4, 9B:
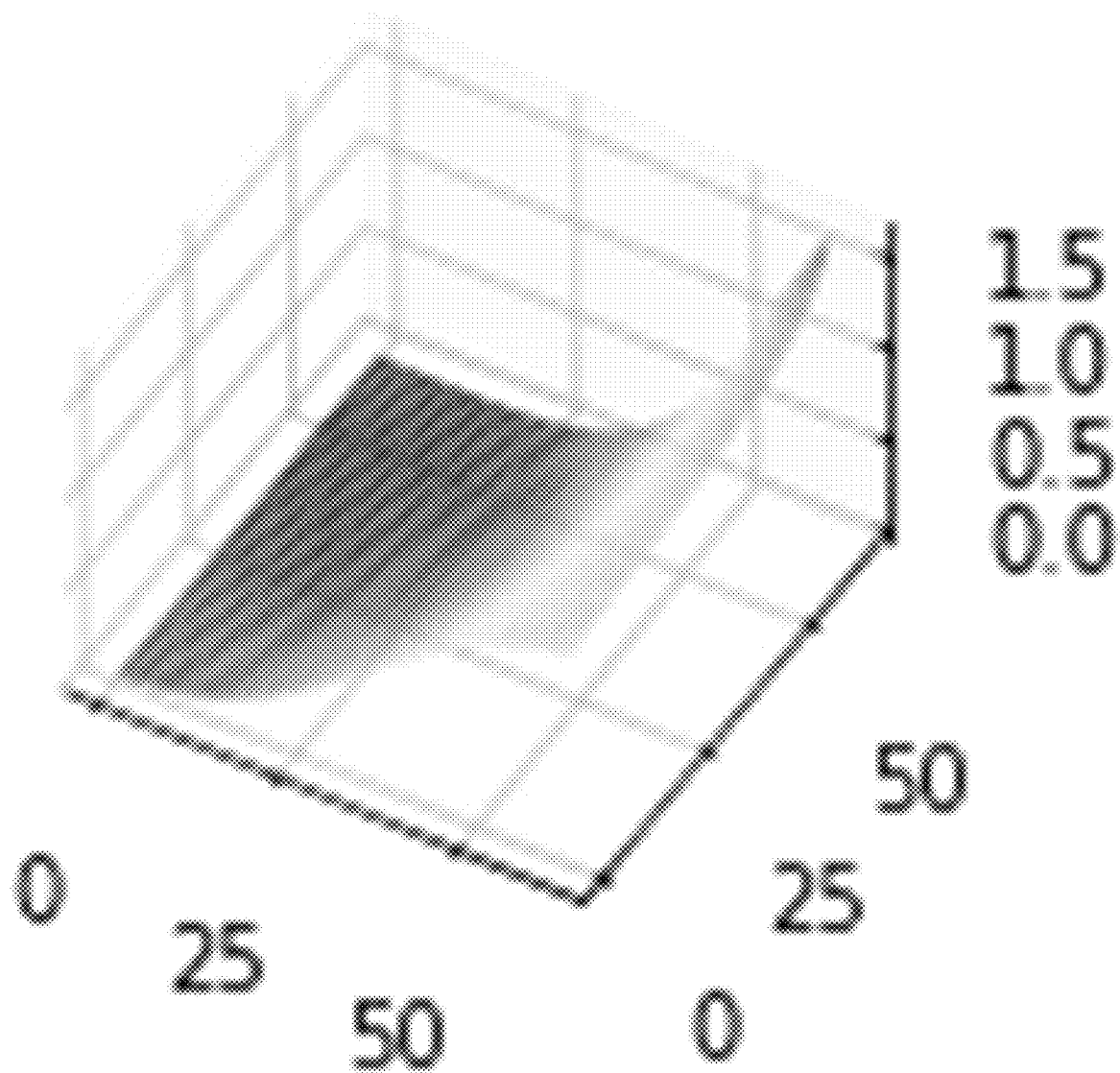

Therefore, the M-1 matrix may be divided by any one of m00, m11 and m02 to achieve the purpose of compressing data into four data. The same operation is also workable for the M matrix, and will not be described herein again. In the embodiment of this application, through the analysis of each data, it is found that by normalizing the M-1 matrix through m11, an optimal result may be obtained. For the convenience of understanding, referring to FIG. 9A-1 through FIG. 9A-5 and FIG. 9B-1 through FIG. 9B-4, FIG. 9A-1 through FIG. 9A-5 and FIG. 9B-1 through FIG. 9B-4 are geometric schematic diagrams of a transformation matrix provided in an embodiment of this application. FIG. 9A-1 through FIG. 9A-5 shows the data contained in the original M matrix, which can be seen that the original M matrix contains a total of 5 variables, namely m00, m02, m11, m20 and m22. FIG. 9B-1 through FIG. 9B-4 shows the data contained in the M-1 matrix after normalization through m11, which can be seen that the M-1 matrix contains a total of 4 variables, namely m00, m02, m20 and m22.

Based on this, in the embodiment of this application, a normalized M-1 matrix may be used as a target transformation matrix used in the embodiment of this application, and then, a vertex corresponding to the vertex position data may be projectively transformed onto a spherical surface based on the target transformation matrix, the shading point data and the vertex position data, thereby generating a first lighting vector associated with the area light based on the vertex projectively transformed onto the spherical surface.

It can be understood that the integration of the polygon mentioned above in a Cosine function is to obtain a product on a spherical surface of an upper hemisphere, so in the existing LTC solution, the polygon needs to be clipped to the upper hemisphere. The following shows a code example for horizon clipping of the upper hemisphere.

```
int clipQuadToHorizon(inout float3 L[5])
{
  /* Detect clipping config */
  int config = 0;
  ...
  if(config == 0) {
    // clip all
  } else if(config == 1) { // V1 clip V2 V3 V4
    ...
  }
  ...
  } else if(config == 15) { // V1 V2 V3 V4
    ...
  }
  if(n == 3)
    L[3] = L[0];
  if(n == 4)
    L[4] = L[0];
  return n;
}
```

As can be seen from the foregoing codes, implementing horizon clipping of a polygon in a shader (which may run on a GPU) may cause a large number of code branches, which is very unfriendly to the operating mechanism of the GPU and may lead to long-term register occupation. Therefore, the method provided in the embodiment of this application will not consider horizon clipping, but will solve the integration by introducing a new approximation method (such as selecting a sphere as a geometric proxy). In other words, the point multiplication (that is, the point multiplication of $$\frac{p_i \times p_j}{\|p_i \times p_j\|}$$

and a vector $$\begin{bmatrix} 0 \\ 0 \\ 1 \end{bmatrix})$$

may be removed from an analytical expression $$\sum_{i=1}^{n} \arccos\langle p_i, p_j \rangle \left\langle \frac{p_i \times p_j}{\|p_i \times p_j\|}, \begin{bmatrix} 0 \\ 0 \\ 1 \end{bmatrix} \right\rangle$$

for integrating a Cosine spherical function and a polygon geometry (referring to Formula (6)) to obtain a vector $$\frac{\arccos\langle p_i, p_j \rangle}{\|p_i \times p_j\|} p_i \times p_j,$$

denoted as $\vec{I}$. The point multiplication of the vector $\vec{I}$ and another unit vector $\vec{T}$ may be understood as the integration of the Cosine spherical function when $\vec{T}$ is the Z axis. The length of $\vec{I}$ is the result of the foregoing form in the case of $\vec{T}$=normalize(I), and $I'_{sphere}$=length($\vec{I}$) may be obtained. Therefore, an opening angle of the sphere may be derived as follows:

$$\text{angular\_extent} = \arcsin\sqrt{\text{length}(\vec{l})} \quad (11)$$

Therefore, an analytical expression of a sphere for $I_{sphere}$ may be obtained as follows:

$$I_{sphere}(\omega, \sigma) = \frac{1}{\pi} \begin{cases} \pi\cos(\omega)\sin^2(\sigma) & \omega \in \left[0, \frac{\pi}{2} - \sigma\right] \\ \pi\cos(\omega)\sin^2(\sigma) + G(\omega, \sigma, \gamma) - H(\omega, \sigma, \gamma) & \omega \in \left[\frac{\pi}{2} - \sigma, \frac{\pi}{2}\right] \\ G(\omega, \sigma, \gamma) + H(\omega, \sigma, \gamma) & \omega \in \left[\frac{\pi}{2}, \frac{\pi}{2} + \sigma\right] \\ 0 & \omega \in \left[\frac{\pi}{2} + \sigma, \pi\right] \end{cases}, \quad (12)$$

where ω in the analytical expression is an included angle between a vector from the center point of a sphere proxy to the origin and the Z axis, and σ is an opening angle of the sphere proxy, where $$\gamma = \sin^{-1}\left(\frac{\cos(\sigma)}{\sin(\omega)}\right) \quad (13)$$

$$G(\omega, \sigma, \gamma) = -2\sin(\omega)\cos(\sigma)\cos(\gamma) + \frac{\pi}{2} - \gamma + \sin(\gamma)\cos(\gamma)$$

$$H(\omega, \sigma, \gamma) = \cos(\omega)\cos(\gamma)\sqrt{\sin^2(\sigma) - \cos^2(\gamma)} + \sin^2(\sigma)\sin^{-1}\left(\frac{\cos(\gamma)}{\sin(\sigma)}\right)$$

However, the foregoing operations are still relatively complex, so the embodiment of this application chooses to save the result of Formula (12) as a map. In this way, during running, ω and σ may be computed first, and then, a solution may be obtained in a mode of table lookup through the two parameters.

Specifically, in the embodiment of this application, the inverse matrix transformation data may contain a normal vector, a view vector and roughness associated with a shading point corresponding to the shading point data. Therefore, the computer device may first perform point multiplication on the normal vector and the view vector to obtain a vector product. It can be understood that the geometric meaning of the vector product is a cosine value of an included angle between the normal vector and the view vector. Further, the computer device may generate an initial transformation matrix based on the vector product and the roughness, and construct a local coordinate system based on the normal vector and the view vector. In the embodiment of this application, the normal vector may be used as a Z axis of the local coordinate system, and the view vector is located in an XZ plane. Therefore, based on the geometric relationship, a corresponding local coordinate system may be quickly constructed. The specific process may be as follows: the normal vector is multiplied by the product obtained by point multiplication of the normal vector and the view vector to obtain a first intermediate result, then the view vector may be subtracted from the first intermediate result to obtain a second intermediate result, and the second intermediate result is normalized to obtain a first coordinate axis, namely an X axis of the local coordinate system; then, an intermediate vector perpendicular to the normal vector and the first coordinate axis may be obtained, and the intermediate vector is normalized to obtain a second coordinate axis, namely a Y axis of the local coordinate system; and moreover, the normal vector may be used as a third coordinate axis, namely a Z axis of the local coordinate system, and finally, the first coordinate axis, the second coordinate axis and the third coordinate axis may be used as the local coordinate system.

Further, the computer device may perform spatial transformation on the initial transformation matrix based on the local coordinate system to obtain a target transformation matrix. The specific process may be as follows: a local coordinate matrix composed of the first coordinate axis, the second coordinate axis and the third coordinate axis in the local coordinate system is transposed to obtain a transposed coordinate matrix, and then, point multiplication is performed on the transposed coordinate matrix and the initial transformation matrix to obtain a target transformation matrix.

Further, the computer device may first transform a vertex corresponding to the vertex position data to the local coordinate system based on the target transformation matrix, the shading point data and the vertex position data, and then perform spherical projection on the vertex transformed to the local coordinate system to obtain a vertex projectively transformed onto a spherical surface. The specific process may be as follows: the computer device may first obtain a position difference between the vertex position data and the shading point data, then perform matrix transformation on the position difference based on the target transformation matrix (such as point multiplication on the position difference and the target transformation matrix) to obtain transformation position data, and use a vertex corresponding to the transformation position data as a vertex transformed to the local coordinate system at this time. Further, the computer device may normalize the transformation position data corresponding to the vertex transformed to the local coordinate system to obtain projection position data, and then use a vertex corresponding to the projection position data as a vertex projectively transformed onto a spherical surface.

Further, the computer device may perform vector integration based on the vertex projectively transformed onto the spherical surface, and use the obtained accumulated integration result as a first lighting vector associated with the area light. It is to be understood that assuming that the area light contains n (n is a positive integer greater than 2) vertices, the number of vertices projectively transformed onto the spherical surface is n. Therefore, the computer device needs to sequentially integrate the edges formed by two adjacent vertices projectively transformed onto the spherical surface in an integration order to obtain an integration result to be accumulated corresponding to each edge, and finally may determine an accumulated integration result corresponding to the region composed of the vertices projectively transformed onto the spherical surface based on the integration result to be accumulated corresponding to each edge. For the convenience of understanding, the embodiment of this application takes solving the integration result to be accumulated on an edge as an example for explanation. Assuming that the foregoing n vertices projectively transformed onto the spherical surface contain a vertex pi and a vertex pj, accordingly, the projection position data may contain projection position data of the vertex pi and projection position data of the vertex pj, where both i and j are positive integers less than or equal to n, j=i+1, and the vertex pi and the vertex pj are identified as adjacent vertices. The specific process may be as follows: point multiplication is performed on the projection position data of the vertex pi and the projection position data of the vertex pj to obtain a cosine value of a vector angle between a first vector associated with the projection position data of the vertex pi and a second vector associated with the projection position data of the vertex pj. Further, a sine value of the vector angle may be determined based on the cosine value of the vector angle, and an angle value of the vector angle may be determined based on the cosine value of the vector angle. Further, when the cosine value of the vector angle is approximated to a rational number, a value interval of the rational number may be determined based on the angle value of the vector angle, a precision fitting function corresponding to the value interval may be obtained, and then, an approximate ratio factor between the angle value of the vector angle and the sine value of the vector angle may be obtained based on the precision fitting function and the value of the rational number in the value interval. Further, a third vector perpendicular to the first vector and the second vector may be obtained, and then, an integration result to be accumulated associated with the vertex pi and the vertex pj may be obtained based on the third vector and the approximate ratio factor (such as multiplication of the third vector and the approximate ratio factor). It can be understood that the process of vector integration for the other adjacent vertices in the foregoing n vertices projectively transformed onto the spherical surface is the same as the process of vector integration for the vertex pi and the vertex pj described above, and will not be described herein again. Finally, an accumulated integration result corresponding to the vertex projectively transformed onto the spherical surface may be determined based on the integration result to be accumulated, and the accumulated integration result may be used as a first lighting vector associated with the area light.

Step S103: Determine relative position information between a shading point corresponding to the shading point data and the area light based on the plane equation data and the shading point data in the service resource data, and determine a second lighting vector based on the relative position information and the first lighting vector.

It is to be understood that the method of using a sphere to approximate a plane described above may not directly solve the orientation problem of the plane, so additional codes are needed for processing. The current shading point position is substituted into a plane equation to ensure that the current shading point position is located on the front face or back face of a plane where the area light is located, and a two-sided light may be processed by inverting the vector $\vec{F}$ (that is, the first lighting vector).

In the embodiment of this application, the plane equation data may include a plane normal vector of a plane where the area light is located and a light distance between an origin in a world coordinate system and the plane. Therefore, the computer device may perform point multiplication on the plane normal vector and shading point data carried by the plane equation data to obtain a point multiplication result, then add the point multiplication result and the light distance carried by the plane equation data to obtain an addition result, subsequently determine relative position information between the shading point corresponding to the shading point data and the area light based on the addition result, and determine a second lighting vector based on the relative position information and the first lighting vector.

The computer device may compare the foregoing addition result with zero, thereby determining relative position information based on the comparison result. In some embodiments, if the addition result is a positive number (that is, the addition result is greater than 0), it can be determined that the shading point corresponding to the shading point data is located on the front face of the area light. On the contrary, if the addition result is a non-positive number (that is, the addition result is less than or equal to 0), it can be determined that the shading point corresponding to the shading point data is located on the back face of the area light.

The specific process of determining a second lighting vector based on the relative position information and the first lighting vector may be as follows: the computer device may first obtain type information of an area light, and the type information may be used for representing the type of the area light. In the embodiment of this application, the type of the area light includes a single-sided light type and a two-sided light type. It can be understood that an area light with the single-sided light type may be referred to as a single-sided light, and an area light with the two-sided light type may be referred to as a two-sided light.

In some embodiments, if the area light is a two-sided light and the relative position information indicates that the shading point is located on the front face of the two-sided light, the first lighting vector may be used as a second lighting vector.

In some embodiments, if the area light is a single-sided light and the relative position information indicates that the shading point is located on the front face of the single-sided light, the first lighting vector may be used as a second lighting vector.

In some embodiments, if the area light is a two-sided light and the relative position information indicates that the shading point is located on the back face of the two-sided light, inverse processing may be performed on the first lighting vector to obtain a second lighting vector.

In some embodiments, if the area light is a single-sided light and the relative position information indicates that the shading point is located on the back face of the single-sided light, the initial rendering data of the area light may be set to zero. In other words, at this time, the single-sided light does not illuminate the shading point, so the shading of the shading point is ineffective.

Step S104: Determine initial rendering data of the area light based on the second lighting vector, determine environmental rendering data of the virtual scene based on the inverse matrix transformation data, and generate target rendering data for rendering the virtual scene based on the environmental rendering data and the initial rendering data.

Specifically, the computer device may determine initial rendering data of the area light based on the second lighting vector, for example, may obtain the vector length of the second lighting vector to obtain a first sphere parameter based on the vector length, and may obtain a unit vector associated with the second lighting vector to obtain a second sphere parameter based on the unit vector. Further, the computer device may search a first integration table based on the obtained first sphere parameter and second sphere parameter, and use the integration result searched from the first integration table as initial rendering data of the area light.

The computer device may first obtain the vector length of the second lighting vector, and then perform extraction of a root on the vector length to obtain the foregoing first sphere parameter.

The computer device may normalize the second lighting vector to obtain a unit vector associated with the second lighting vector, and use a target component in the unit vector as the second sphere parameter.

Further, the computer device may determine environmental rendering data of the virtual scene based on the inverse matrix transformation data, and then generate target rendering data for rendering the virtual scene based on the environmental rendering data and the initial rendering data. The specific process of generating target rendering data may be as follows: the computer device may add the environmental rendering data and the initial rendering data to obtain a highlight result, then search a second integration table based on the vector product and the roughness, and use the integration result searched from the second integration table as a target normalization coefficient associated with the Fresnel term. Further, the computer device may determine target rendering data for rendering the virtual scene based on the highlight result, the target normalization coefficient and the material attribute corresponding to the shading point.

Based on the method described above, the embodiment of this application may provide an optimized shader code example as follows (evaluateQuadLight is an analytical expression for solving the integration of the area light), where N is a normal vector, V is a view vector, P is the position of the currently computed shading point (that is, shading point data), points are the vertex positions of the area light (that is, vertex position data), NoV is the point multiplication (that is, the vector product) of N and V, linearRoughness is the roughness of a material, and two Sided is the type information of the area light, that is, whether the area light is a two-sided light. It can be understood that for the convenience of illustration, the following code examples take a quadrilateral area light as an example for illustration, and the codes corresponding to area lights of the other shapes are similar to this.

```
float evaluateQuadLight(float3 N, float3 V, float3 P, float3 points[4], float4
planeEquation, float NoV, float linearRoughness, bool two Sided)
{
    float3x3 invM = getLtcMatrix(NoV, linearRoughness); //Generate an
initial transformation matrix
    /* Construct a local coordinate system, where a normal vector N of an
object is a Z axis, and a view vector V is located in an XZ plane */
    float3x3 basis;
    basis[0] = normalize(V - N * dot(N, V)); //First coordinate axis
    basis[1] = normalize(cross(N, basis[0])); //Second coordinate axis
    basis[2] = N; //Third coordinate axis
    invM = mul(transpose(basis), invM); //Generate a target transformation
matrix
    /* Transform each vertex of an area light to the local coordinate system,
and project each vertex onto a spherical surface to finally obtain an array L[4] storing
projection position data */
    float3 L[4];
    L[0] = normalize(mul(points[0] - P, invM));
    L[1] = normalize(mul(points[1] - P, invM));
    L[2] = normalize(mul(points[2] - P, invM));
    L[3] = normalize(mul(points[3] - P, invM));
    /* Directly solve a vector form of a form factor without considering
horizon clipping, that is, perform vector integration based on the vertex projectively
transformed onto the spherical surface */
    float3 F = 0;
    F += integrateEdgeVectorForm(L[0], L[1]);
    F += integrateEdgeVectorForm(L[1], L[2]);
    F += integrateEdgeVectorForm(L[2], L[3]);
    F += integrateEdgeVectorForm(L[3], L[0]);
    F *= M_INV_TWO_PI;//F obtained here is a first lighting vector
    /* Judge whether the current shading point is located on the back face of
the area light, that is, determine relative position information between the shading point and
the area light */
    bool frontface = (dot(planeEquation.xyz, P) + planeEquation.w) > 0;//
Compare an addition result with zero
    if (!two Sided && !frontface)
    {
       return 0; //Set the initial rendering data of the area light to zero
    }
    else
    {
       F *= frontface ? 1.0 : -1.0; //Determine a second lighting vector
based on the relative position information and the first lighting vector, where perform inverse
processing on the first lighting vector when F *(-0.1)
    }
    /* Select parameters when a sphere is a geometric proxy according to the
vector form of the form factor */
    float squaredSinSigma = length(F);
    float sinSigma = sqrt(squaredSinSigma);// sinSigma is a first sphere
parameter
    float3 normFormFactor = normalize(F);// normFormFactor is a unit
vector
    float cosOmega = normFormFactor.z;// cosOmega is a second sphere
parameter, and normFormFactor.z is a target component in the unit vector normFormFactor
       /* Solve a final result by searching a 2D LUT (LUT is short for lookup
table, referring to a first integration table here) according to geometric parameters of the
sphere, that is, search the first integration table based on the first sphere parameter and the
second sphere parameter */
    float sum = getSphereFormFactor(sinSigma, cosOmega);
    return sum;
}
```

It is to be understood that the specific implementation processes corresponding to the foregoing code examples may be seen in the relevant descriptions of step S102 to step S104 in the embodiment corresponding to FIG. 3, and will not be described herein again.

For vector integration, the function integrateEdge Vector-Form in the foregoing codes corresponds to solving $$\frac{\arccos\langle p_i, p_j \rangle}{\|p_i \times p_j\|} p_i \times p_j.$$

Generally speaking, two given points $p_i$ and $p_j$ may be solved through a cos function and a cross function, and code examples are as follows:

```
float3 integrateEdgeVectorForm(float3 p_i, float3 p_j)
{
    float cosTheta = dot(p_i, p_j) //Obtain a cosine value of a vector angle
between a first vector associated with the projection position data of the vertex pi and a
second vector associated with the projection position data of the vertex pj
    float sinTheta = sqrt(1 – cosTheta*cosTheta)//Obtain a sine value of the
foregoing vector angle
    float theta = acos(cosTheta)//Obtain an angle value of the foregoing
vector angle
    return cross(p_i, p_j) * theta / sinTheta;//Obtain an integration result to be
accumulated associated with the vertex pi and the vertex pj
}
```

Figure 10A:
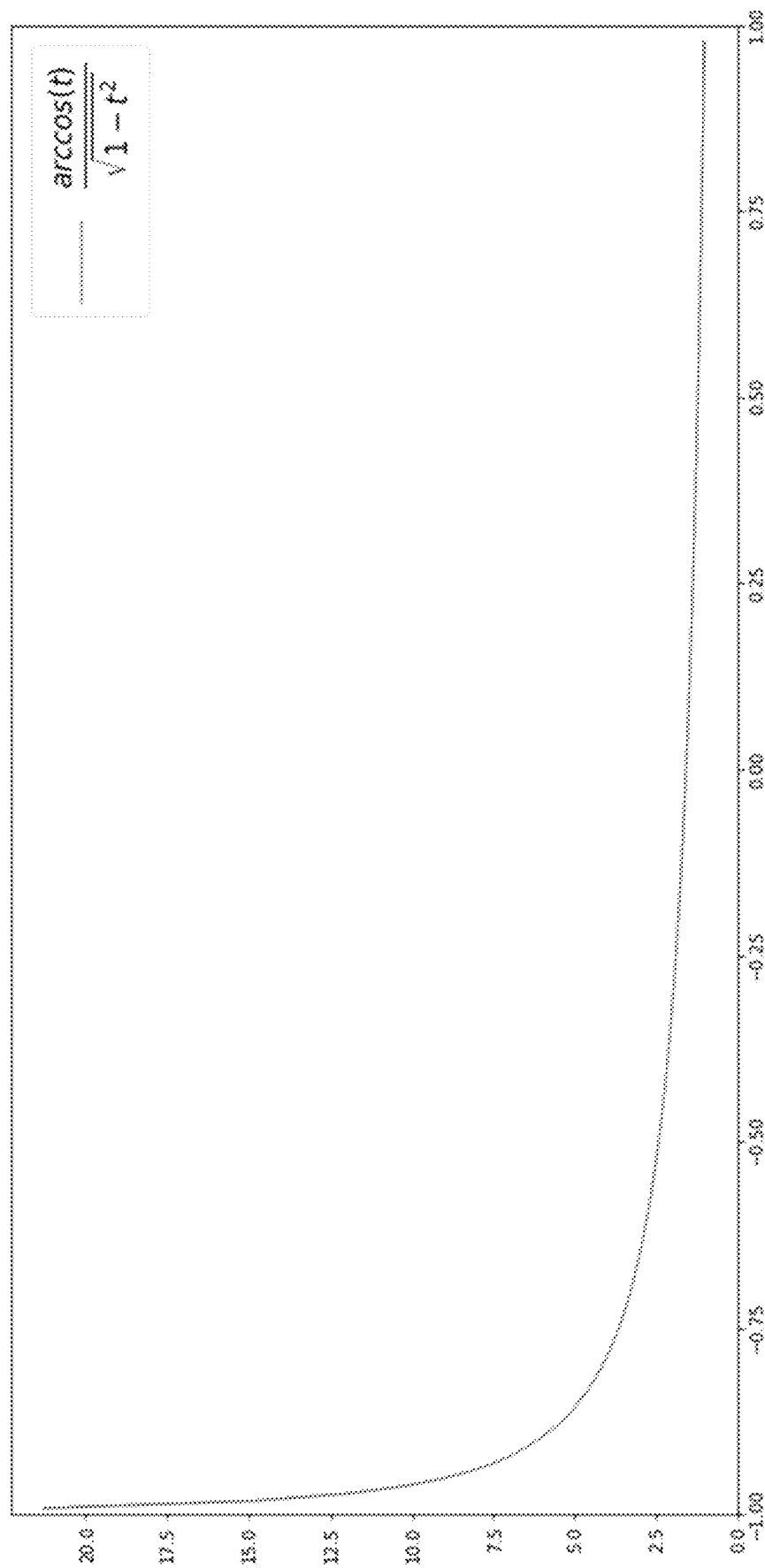
FIG. 10A and FIG. 10B are schematic diagrams of a fitting function provided in an embodiment of this application.
Figure 10B:
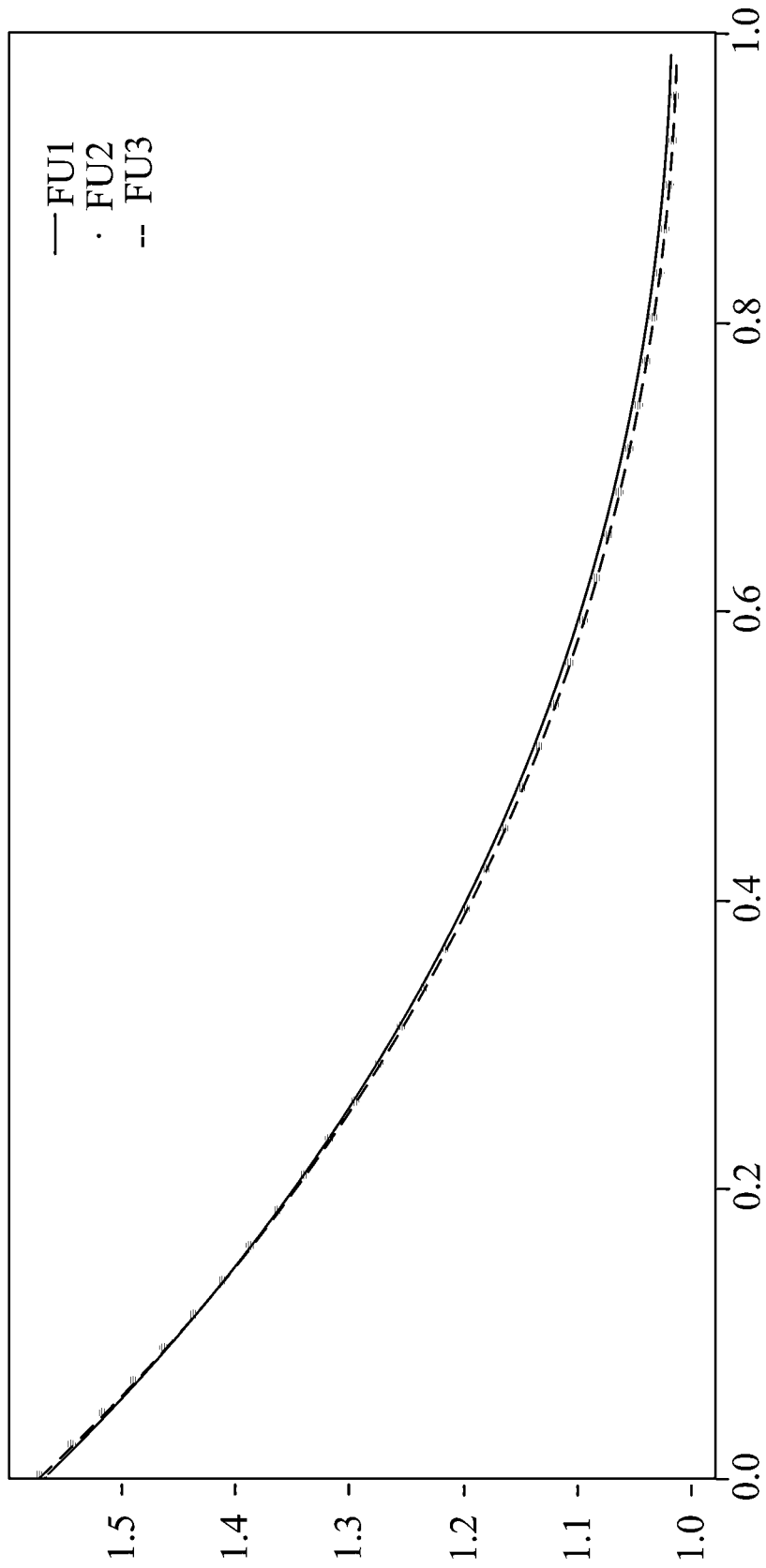

However, due to the inclusion of an acos function and the solution of θ/sin(θ) the foregoing codes, the computational cost will be relatively high, and secondly, sin(θ) may be close to 0, resulting in inf/nan. In addition, the embodiment of this application hopes to increase the proportion of the FP16 (half-precision floating point number) operation in the entire computational process as much as possible. As a result, the embodiment of this application will parameterize θ/sin(θ) with t=cos(θ) (that is, the cosine value cos(θ) of the vector angle is approximated to a rational number t) to obtain $$\frac{\arccos t}{\sqrt{1-t^2}},$$

where arccost is a symmetric function about $$\left(0, \frac{\pi}{2}\right),$$

and $$\frac{1}{\sqrt{1-t^2}}$$

is an even function. Therefore, the value of the domain of definition [−1, 0] may be computed by the result of the domain of definition [0, 1], and the attention may be focused on the scope [0, 1] (that is, the value interval of the rational number t). For the convenience of understanding, referring to FIG. 10A and FIG. 10B, FIG. 10A and FIG. 10B are schematic diagrams of a fitting function provided in an embodiment of this application. FIG. 10A shows a curve corresponding to the function $$\frac{\arccos t}{\sqrt{1-t^2}}$$

in an interval [−1, 1]. Through observation, it can be seen that the function is relatively smooth in the interval [0, 1]. Therefore, the embodiment of this application may meet the requirements by fitting the function with a low-order rational function or polynomial. For example, taking polynomial fitting as an example, the embodiment of this application may use a polynomial $$0.33735186 * x^2 - 0.89665001 * x + \frac{\pi}{2}$$

as a precision fitting function (as shown in FIG. 10B) with an error rate of less than 1%, and the entire polynomial computation may be performed under the 16-bit floating point number (FP16) and may meet the precision requirements of a mobile platform. Therefore, an approximate ratio factor between the angle value θ of the foregoing vector angle and the sine value sin(θ) of the vector angle (that is, an approximate value of θ/sin(θ) may be quickly obtained based on the precision fitting function and the value of the foregoing rational number t in the interval [0, 1]. FIG. 10B shows three curves, namely a curve FU1, a curve FU2, and a curve FU3, where the curve FU1 is the curve corresponding to the foregoing function $$\frac{\arccos t}{\sqrt{1-t^2}}$$

in the interval [0, 1], the curve FU2 is the curve corresponding to the fitting function operated by FP16 (that is, the precision fitting function in the embodiment of this application) in the interval [0, 1], and the curve FU3 is the curve corresponding to the fitting function operated by FP32 (that is, the single-precision floating point number) in the interval [0, 1]. It can be seen that two fitting functions have similar fitting effects on the foregoing function $$\frac{\arccos t}{\sqrt{1-t^2}}.$$

However, compared to the operation performed by FP32, the operation performed by FP16 may reduce the data storage capacity, thereby reducing the use of the register of the GPU, and improving the problem of occupation of the GPU. In addition, the operation performed by FP16 has higher efficiency, thereby increasing the rendering efficiency.

In addition, in the previous implementation, the Fresnel term in the BRDF is not considered. Therefore, an embodiment of this application further provides an approximate solution that considers the Fresnel term together. It can be understood that a property of LTC is that the integration on a spherical surface is identically equal to 1, but due to the masking-shadowing function in the BRDF, the integration of the BRDF on a hemispherical surface is less than 1. Therefore, a separate normalization coefficient needs to be stored as follows:

$$\int_\Omega D(\omega_h)G(\omega_i, \omega_o)\cos(\theta_i)d\omega_i, \quad (14)$$

where $D(\omega_h)$ is a normal distribution function in a BRDF, and $G(\omega_i, \omega_o)$ is a masking associated factor. In the embodiment of this application, the Fresnel term (that is, $F(\omega_i, \omega_h)$) may be substituted into the foregoing normalization coefficient to obtain an approximate solution that considers the Fresnel term together, where the target normalization coefficient associated with the Fresnel term is as follows:

$$\int_\Omega F(\omega_i, \omega_h)D(\omega_h)G(\omega_i, \omega_o)\cos(\theta_i)d\omega_i \quad (15)$$

Based on this, in a shading process, the specific value of the target normalization coefficient may be searched from the second integration table generated in advance, and the table lookup operation only needs to be performed once (that is, the LUT of the environmental light and the LUT of the area light are combined into one). Corresponding code examples are as follows:

table lookup and using polynomial or rational functions for fitting, so the number of instructions required for the entire rendering process may be effectively reduced. For example, during experiments, the number of generated instructions is reduced by nearly 50%, and the occupation of memory resources (such as register resources) of the computer device may be reduced, thereby improving the rendering efficiency.

Figure 11:
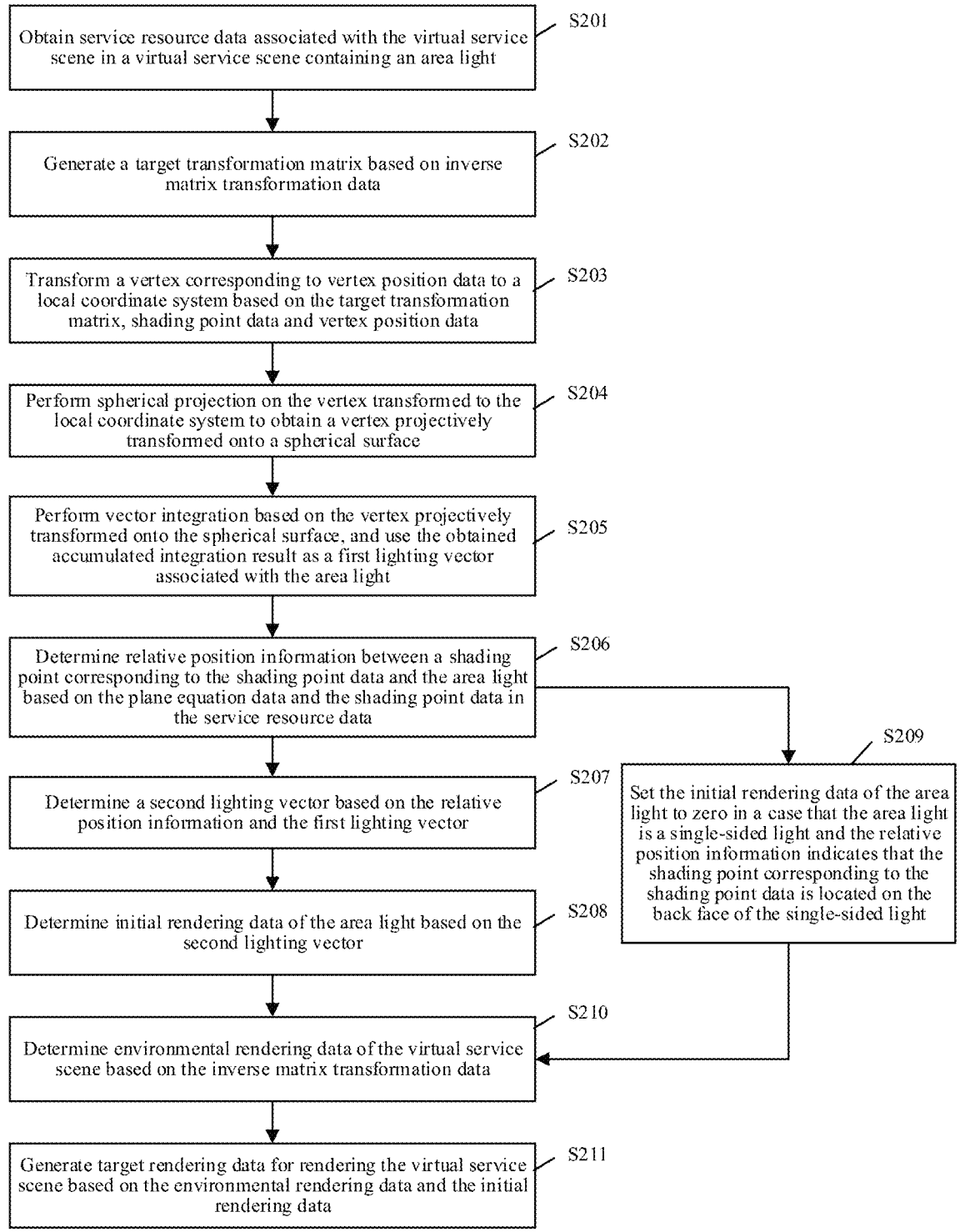
FIG. 11 is a schematic flowchart of a data processing method provided in an embodiment of this application.

Further, referring to FIG. 11, FIG. 11 is a schematic flowchart of a data processing method provided in an embodiment of this application. As shown in FIG. 11, the method may be performed by a computer device with a rendering function. The computer device may be a user terminal (such as the user terminal 200a shown in FIG. 1) or a server (such as the server 100 shown in FIG. 1), which is not limited herein. For the convenience of understanding, the embodiment of this application takes the method performed by a server as an example for explanation. The method may at least include the following steps:

Step S201: Obtain service resource data associated with the virtual scene in a virtual scene containing an area light.

Step S202: Generate a target transformation matrix based on inverse matrix transformation data.

Step S203: Transform a vertex corresponding to vertex position data to a local coordinate system based on the target transformation matrix, shading point data and vertex position data.

Step S204: Perform spherical projection on the vertex transformed to the local coordinate system to obtain a vertex projectively transformed onto a spherical surface.

Step S205: Perform vector integration based on the vertex projectively transformed onto the spherical surface, and use the obtained accumulated integration result as a first lighting vector associated with the area light.

Step S206: Determine relative position information between a shading point corresponding to the shading point data and the area light based on the plane equation data and the shading point data in the service resource data.

Step S207: Determine a second lighting vector based on the relative position information and the first lighting vector.

```
half3 specularLd = 0;
// N: Normal vector
// V: View vector
// position: Position of the current shading point
// quadVertices: Positions of four vertices of area light (taking a quadrilateral
area light as an example)
// planeEquation: Plane equation of area light
// Solve highlight terms of the environmental light (that is, environmental
rendering data)
    specularLd += imageBasedLighting(N, V, linearRoughness);
// Solve highlight terms of the area light (that is, initial rendering data)
    specularLd += evaluateQuadLight(N, V, position, quadVertices, planeEquation,
NoV, linearRoughness, two Sided); //At this time, the accumulated specularLd is a highlight
result
// Query the LUT of the product of D, F and G in the pre-computed BRDF
(that is, the second integration table)
    half2 dfg = preintegratedDFG(NoV, linearRoughness); // dfg is a target
normalization coefficient associated with the Fresnel term
// Use Split Sum Approximation, where the specularColor is a material
attribute, and the finally obtained specular is target rendering data
    specular += specularLd * (specularColor * dfg.x + dfg.y);
```

As can be seen from the above, in embodiment of this application, the process of solving the integration of an area light (for example, generating a first lighting vector) does not consider horizon clipping, but is achieved by performing Step S208: Determine initial rendering data of the area light based on the second lighting vector.

Step S209: Set the initial rendering data of the area light to zero when the area light is a single-sided light and the relative position information indicates that the shading point corresponding to the shading point data is located on the back face of the single-sided light.

Step S210: Determine environmental rendering data of the virtual scene based on the inverse matrix transformation data.

Step S211: Generate target rendering data for rendering the virtual scene based on the environmental rendering data and the initial rendering data.

For specific implementations of each step in the embodiment of this application, reference may be made to step S101 to step S104 in the embodiment corresponding to FIG. 3, and details are not described herein again. The same beneficial effects are not described herein again.

Figure 12:
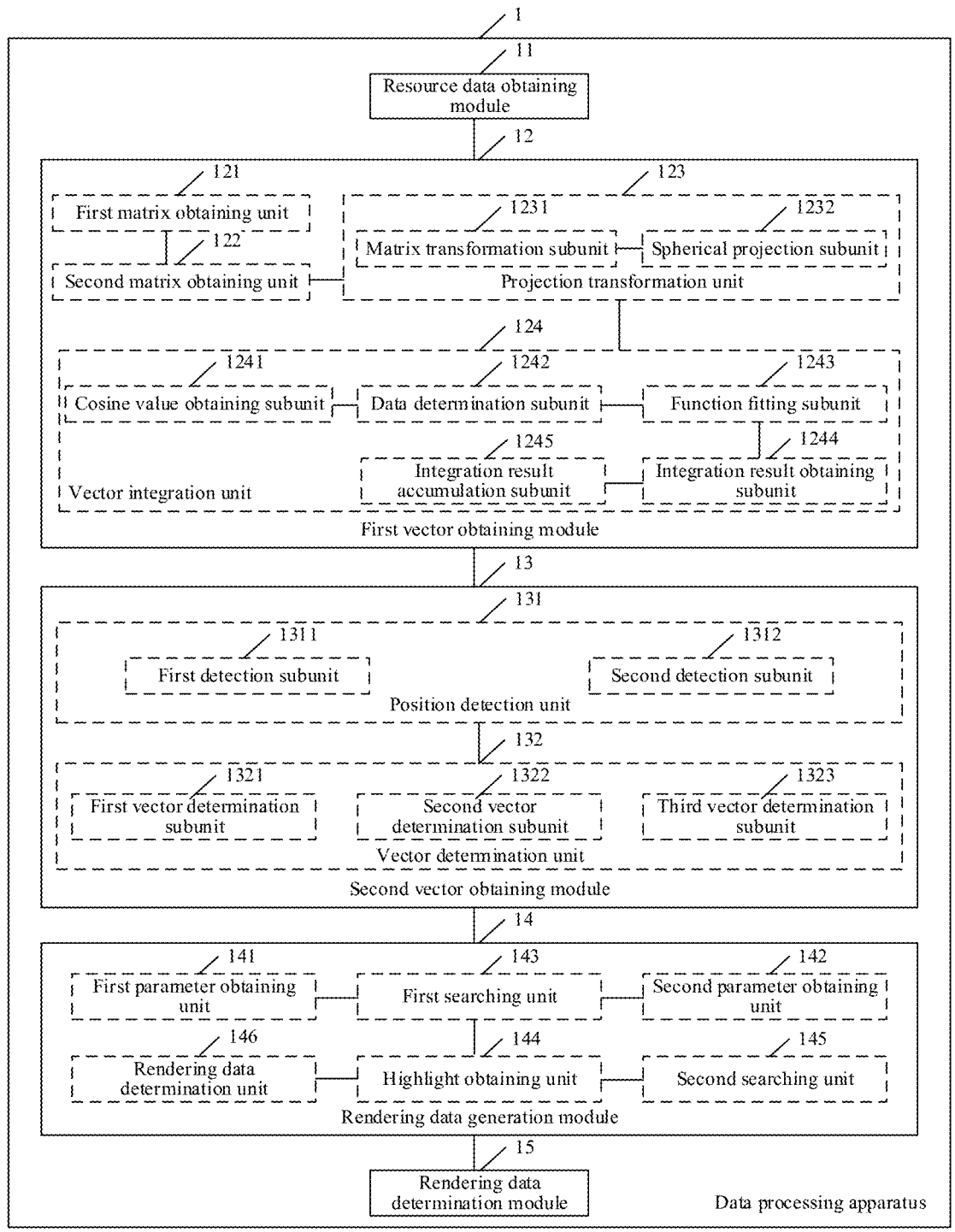
FIG. 12 is a schematic structural diagram of a data processing apparatus provided in an embodiment of this application.

Further, referring to FIG. 12, FIG. 12 is a schematic structural diagram of a data processing apparatus provided in an embodiment of this application. As shown in FIG. 12, the data processing apparatus 1 may be a computer program (including program codes) running in a computer device. For example, the data processing apparatus 1 is application software. The data processing apparatus 1 may be configured to perform the corresponding steps in the methods provided in the embodiments of this application. As shown in FIG. 11, the data processing apparatus 1 may run in a computer device with a rendering function, and the computer device may be the server 100 in the embodiment corresponding to FIG. 1. The data processing apparatus 1 may include: a resource data obtaining module 11, a first vector obtaining module 12, a second vector obtaining module 13, a rendering data generation module 14, and a rendering data determination module 15.

The resource data obtaining module 11 is configured to obtain service resource data associated with the virtual scene in a virtual scene containing an area light. The service resource data contains shading point data, inverse matrix transformation data, vertex position data and plane equation data associated with the area light.

The first vector obtaining module 12 is configured to generate a target transformation matrix based on the inverse matrix transformation data, projectively transform a vertex corresponding to the vertex position data onto a spherical surface based on the target transformation matrix, the shading point data and the vertex position data, and generate a first lighting vector associated with the area light based on the vertex projectively transformed onto the spherical surface.

The inverse matrix transformation data contains a normal vector, a view vector and roughness associated with the shading point corresponding to the shading point data.

The first vector obtaining module 12 may include: a first matrix obtaining unit 121, a second matrix obtaining unit 122, a projection transformation unit 123, and a vector integration unit 124.

The first matrix obtaining unit 121 is configured to perform point multiplication on the normal vector and the view vector to obtain a vector product, generate an initial transformation matrix based on the vector product and the roughness, and construct a local coordinate system based on the normal vector and the view vector.

The second matrix obtaining unit 122 is configured to perform spatial transformation on the initial transformation matrix based on the local coordinate system to obtain a target transformation matrix.

The projection transformation unit 123 is configured to transform a vertex corresponding to the vertex position data to the local coordinate system based on the target transformation matrix, the shading point data and the vertex position data, and perform spherical projection on the vertex transformed to the local coordinate system to obtain a vertex projectively transformed onto a spherical surface.

The projection transformation unit 123 may include: a matrix transformation subunit 1231, and a spherical projection subunit 1232.

The matrix transformation subunit 1231 is configured to obtain a position difference between the vertex position data and the shading point data, perform matrix transformation on the position difference based on the target transformation matrix to obtain transformation position data, and use a vertex corresponding to the transformation position data as a vertex transformed to the local coordinate system.

The spherical projection subunit 1232 is configured to normalize the transformation position data corresponding to the vertex transformed to the local coordinate system to obtain projection position data, and use a vertex corresponding to the projection position data as a vertex projectively transformed onto a spherical surface.

For specific implementations of the matrix transformation subunit 1231 and the spherical projection subunit 1232, reference may be made to the description for step S102 in the embodiment corresponding to FIG. 3, and details are not described herein again.

The vector integration unit 124 is configured to perform vector integration based on the vertex projectively transformed onto the spherical surface, and use the obtained accumulated integration result as a first lighting vector associated with the area light.

When the area light contains n vertices, the number of vertices projectively transformed onto the spherical surface is n; n vertices projectively transformed onto the spherical surface contain a vertex pi and a vertex pj; the projection position data contains projection position data of the vertex pi and projection position data of the vertex pj; and n is a positive integer greater than 2, i and j are both positive integers less than or equal to n, and j=i+1.

The vector integration unit 124 may include: a cosine value obtaining subunit 1241, a data determination subunit 1242, a function fitting subunit 1243, an integration result obtaining subunit 1244, and an integration result accumulation subunit 1245.

The cosine value obtaining subunit 1241 is configured to perform point multiplication on the projection position data of the vertex pi and the projection position data of the vertex pj to obtain a cosine value of a vector angle between a first vector associated with the projection position data of the vertex pi and a second vector associated with the projection position data of the vertex pj.

The data determination subunit 1242 is configured to determine a sine value of the vector angle based on the cosine value of the vector angle, and determine an angle value of the vector angle based on the cosine value of the vector angle.

The function fitting subunit 1243 is configured to determine a value interval of the rational number based on the angle value of the vector angle when the cosine value of the vector angle is approximated to a rational number, obtain a precision fitting function corresponding to the value interval, and obtain an approximate ratio factor between the angle value of the vector angle and the sine value of the vector angle based on the precision fitting function and the value of the rational number in the value interval.

The integration result obtaining subunit 1244 is configured to obtain a third vector perpendicular to the first vector and the second vector, and obtain an integration result to be accumulated associated with the vertex pi and the vertex pj based on the third vector and the approximate ratio factor.

The integration result accumulation subunit 1245 is configured to determine an accumulated integration result corresponding to the vertex projectively transformed onto the spherical surface based on the integration result to be accumulated, and use the accumulated integration result as a first lighting vector associated with the area light.

For specific implementations of the cosine value obtaining subunit 1241, the data determination subunit 1242, the function fitting subunit 1243, the integration result obtaining subunit 1244 and the integration result accumulation subunit 1245, reference may be made to the descriptions for step S102 in the embodiment corresponding to FIG. 3, and details are not described herein again.

For specific implementations of the first matrix obtaining unit 121, the second matrix obtaining unit 122, the projection transformation unit 123 and the vector integration unit 124, reference may be made to the descriptions for step S102 in the embodiment corresponding to FIG. 3, and details are not described herein again.

The second vector obtaining module 13 is configured to determine relative position information between a shading point corresponding to the shading point data and the area light based on the plane equation data and the shading point data in the service resource data, and determine a second lighting vector based on the relative position information and the first lighting vector.

The plane equation data includes a plane normal vector of a plane where the area light is located and a light distance between an origin in a world coordinate system and the plane.

The second vector obtaining module 13 may include: a position detection unit 131, and a vector determination unit 132.

The position detection unit 131 is configured to perform point multiplication on the plane normal vector and the shading point data to obtain a point multiplication result, add the point multiplication result and the light distance to obtain an addition result, and determine relative position information between a shading point corresponding to the shading point data and the area light based on the addition result.

The position detection unit 131 may include: a first detection subunit 1311, and a second detection subunit 1312.

The first detection subunit 1311 is configured to determine that the shading point corresponding to the shading point data is located on the front face of the area light when the addition result is a positive number.

The second detection subunit 1312 is configured to determine that the shading point corresponding to the shading point data is located on the back face of the area light when the addition result is a non-positive number.

For specific implementations of the first detection subunit 1311 and the second detection subunit 1312, reference may be made to the descriptions for step S103 in the embodiment corresponding to FIG. 3, and details are not described herein again.

The vector determination unit 132 is configured to determine a second lighting vector based on the relative position information and the first lighting vector.

The vector determination unit 132 may include: a first vector determination subunit 1321, a second vector determination subunit 1322, and a third vector determination subunit 1323.

The first vector determination subunit 1321 is configured to use the first lighting vector as a second lighting vector when the area light is a two-sided light and the relative position information indicates that the shading point is located on the front face of the two-sided light.

The second vector determination subunit 1322 is configured to use the first lighting vector as a second lighting vector when the area light is a single-sided light and the relative position information indicates that the shading point is located on the front face of the single-sided light.

The third vector determination subunit 1323 is configured to perform inverse processing on the first lighting vector to obtain a second lighting vector when the area light is a two-sided light and the relative position information indicates that the shading point is located on the back face of the two-sided light.

For specific implementations of the first vector determination subunit 1321, the second vector determination subunit 1322 and the third vector determination subunit 1323, reference may be made to the descriptions for step S103 in the embodiment corresponding to FIG. 3, and details are not described herein again.

For specific implementations of the position detection unit 131 and the vector determination unit 132, reference may be made to the descriptions for step S103 in the embodiment corresponding to FIG. 3, and details are not described herein again.

The rendering data generation module 14 is configured to determine initial rendering data of the area light based on the second lighting vector, determine environmental rendering data of the virtual scene based on the inverse matrix transformation data, and generate target rendering data for rendering the virtual scene based on the environmental rendering data and the initial rendering data.

The rendering data generation module 14 may include: a first parameter obtaining unit 141, a second parameter obtaining unit 142, a first searching unit 143, a highlight obtaining unit 144, a second searching unit 145, and a rendering data determination unit 146.

The first parameter obtaining unit 141 is configured to obtain a vector length of the second lighting vector, and obtain a first sphere parameter based on the vector length.

The first parameter obtaining unit 141 is specifically configured to obtain a vector length of the second lighting vector, and perform extraction of a root on the vector length to obtain a first sphere parameter.

The second parameter obtaining unit 142 is configured to obtain a unit vector associated with the second lighting vector, and obtain a second sphere parameter based on the unit vector.

The second parameter obtaining unit 142 is specifically configured to normalize the second lighting vector to obtain a unit vector associated with the second lighting vector, and use a target component in the unit vector as a second sphere parameter.

The first searching unit 143 is configured to search a first integration table based on the first sphere parameter and the second sphere parameter, and use the integration result searched from the first integration table as initial rendering data of the area light.

The highlight obtaining unit 144 is configured to add the environmental rendering data and the initial rendering data to obtain a highlight result.

The second searching unit 145 is configured to search a second integration table based on the vector product and the roughness, and use the integration result searched from the second integration table as a target normalization coefficient associated with the Fresnel term.

The rendering data determination unit 146 is configured to determine target rendering data for rendering the virtual scene based on the highlight result, the target normalization coefficient and the material attribute corresponding to the shading point.

For specific implementations of the first parameter obtaining unit 141, the second parameter obtaining unit 142, the first searching unit 143, the highlight obtaining unit 144, the second searching unit 145 and the rendering data determination unit 146, reference may be made to the descriptions for step S104 in the embodiment corresponding to FIG. 3, and details are not described herein again.

The rendering data determination module 15 is configured to set the initial rendering data of the area light to zero when the area light is a single-sided light and the relative position information indicates that the shading point corresponding to the shading point data is located on the back face of the single-sided light.

For specific implementations of the resource data obtaining module 11, the first vector obtaining module 12, the second vector obtaining module 13, the rendering data generation module 14 and the rendering data determination module 15, reference may be made to the descriptions for step S101 to step S104 in the embodiment corresponding to FIG. 3, and details are not described herein again. In addition, the descriptions of beneficial effects of the same method are not described herein again.

Figure 13:
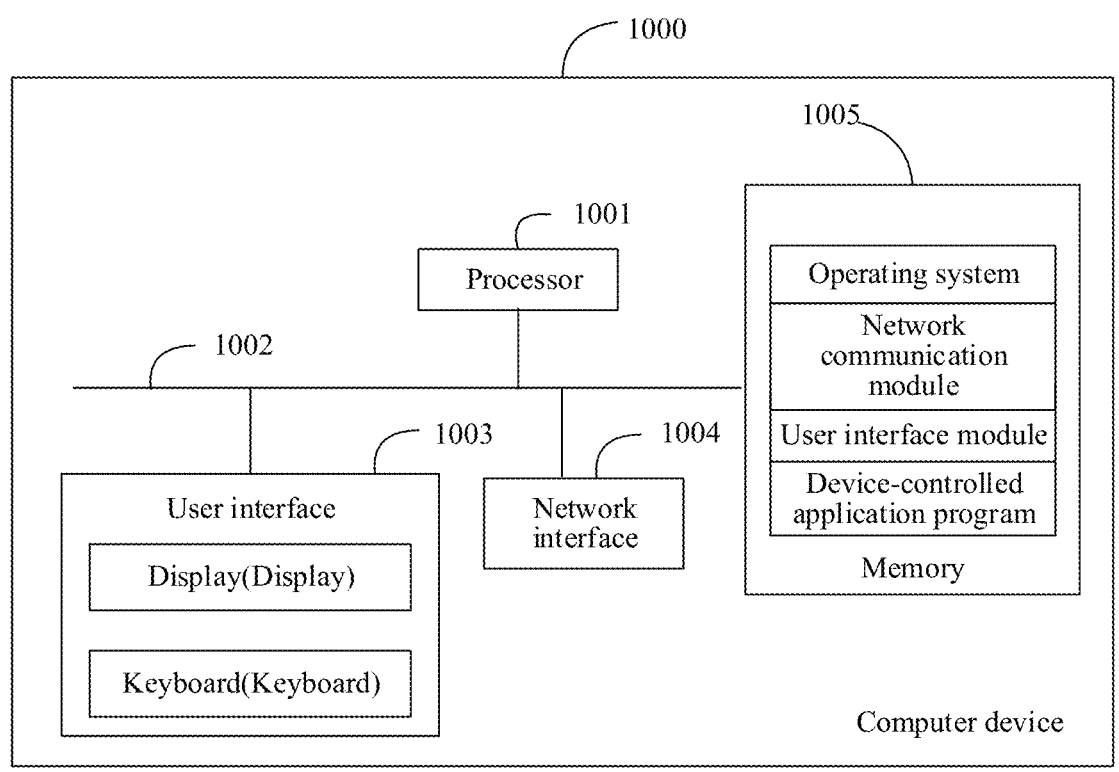
FIG. 13 is a schematic structural diagram of a computer device provided in an embodiment of this application.

Further, referring to FIG. 13, FIG. 13 is a schematic structural diagram of a computer device provided in an embodiment of this application. As shown in FIG. 13, the computer device 1000 may include: a processor 1001, a network interface 1004, and a memory 1005. Furthermore, the computer device 1000 may further include: a user interface 1003 and at least one communication bus 1002. The communication bus 1002 is configured to implement the connection and communication between these components. The user interface 1003 may include a display and a keyboard. In some embodiments, the user interface 1003 may further include a standard wired interface and a standard wireless interface. In some embodiments, the network interface 1004 may include a standard wired interface and a standard wireless interface (for example, a WI-FI interface). The memory 1004 may be a high-speed random access memory (RAM), or a non-volatile memory, for example, at least one magnetic disk memory. In some embodiments, the memory 1005 may further be at least one storage apparatus that is located far away from the processor 1001. As shown in FIG. 13, the memory 1005 used as a computer-readable storage medium may include an operating system, a network communication module, a user interface module, and a device-controlled application program.

In the computer device 1000 shown in FIG. 13, the network interface 1004 may provide a network communication function; and the user interface 1003 is mainly configured to provide an input interface for users. The processor 1001 may be configured to call a device-controlled application program stored in the memory 1005 to perform the descriptions for the data processing method in any embodiment corresponding to FIG. 3 or FIG. 11, which will not be described herein again. In addition, the descriptions of beneficial effects of the same method are not described herein again.

In addition, an embodiment of this application further provides a computer-readable storage medium, the computer-readable storage medium stores a computer program executed by the data processing apparatus 1 mentioned above, and the computer program includes a program instruction. When executing the program instruction, a processor may perform the descriptions for the data processing method in any embodiment corresponding to FIG. 3 or FIG. 11, which will not be described herein again. In addition, the descriptions of beneficial effects of the same method are not described herein again. For technical details that are not disclosed in the embodiments of the computer-readable storage medium involved in this application, refer to the descriptions of the method embodiments of this application.

The foregoing computer-readable storage medium may be a data processing apparatus provided in any of the foregoing embodiments or an internal storage unit of the foregoing computer device, such as a hard disk or a memory of the computer device. The computer-readable storage medium may also be an external storage device of the computer device, such as a plug-in hard disk, a smart media card (SMC), a secure digital (SD) card, or a flash card equipped on the computer device. Further, the computer-readable storage medium may also include both an internal storage unit of the computer device and an external storage device. The computer-readable storage medium is configured to store the computer program and other programs and data required by the computer device. The computer-readable storage medium may also be configured to temporarily store the data that has been outputted or will be outputted.

In addition, an embodiment of this application further provides a computer program product or a computer program, the computer program product or the computer program includes a computer instruction, and the computer instruction is stored in a computer-readable storage medium. A processor of a computer device reads the computer instruction from the computer-readable storage medium, and the processor executes the computer instruction to cause the computer device to perform the method provided in any embodiment corresponding to FIG. 3 or FIG. 11. In addition, the descriptions of beneficial effects of the same method are not described herein again. For technical details that are not disclosed in the embodiments of the computer program product or the computer program involved in this application, refer to the descriptions of the method embodiments of this application.

The terms "first". "second", and the like, in the specification, claims or accompanying drawings of the embodiments of this application are used for distinguishing different objects, rather than used for describing a specific sequence. In addition, the terms "include" and any variant thereof are intended to cover a non-exclusive inclusion. For example, a process, method, apparatus, product, or device that includes a series of steps or units is not limited to the listed steps or modules, and instead, further includes a step or module that is not listed, or further includes another step or unit that is intrinsic to the process, method, apparatus, product, or device.

A person of ordinary skill in the art may understand that units, modules and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on functions. Whether the functions are executed in a mode of hardware or software depends on particular applications and design constraint conditions of the technical solutions. A person skilled in the art may use different methods to implement the described functions for each particular application, but it is not considered that the implementation goes beyond the scope of this application.

Technical features of the foregoing embodiments may be randomly combined. To make the description concise, not all possible combinations of the technical features in the foregoing embodiments are described. However, the combinations of these technical features are considered as falling within the scope recorded by this specification provided that no conflict exists.

What are disclosed above are merely exemplary embodiments of this application, and certainly are not intended to limit the scope of the claims of this application. Therefore, equivalent variations made in accordance with the claims of this application still fall within the scope of this application.

What is claimed is:

1. A method performed by a computer device, comprising:
obtaining service resource data associated with a virtual scene containing an area light, the service resource data containing shading point data, inverse matrix transformation data, vertex position data and plane equation data associated with the area light;
generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface;
determining relative position information between a shading point corresponding to the shading point data and the area light based on the plane equation data and the shading point data in the service resource data, and a second lighting vector based on the relative position information and the first lighting vector; and
generating target rendering data for rendering the virtual scene based on the second lighting vector and the inverse matrix transformation data.

2. The method according to claim 1, wherein the inverse matrix transformation data contains a normal vector, a view vector and roughness associated with the shading point corresponding to the shading point data;
the generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface comprises:
performing point multiplication on the normal vector and the view vector to obtain a vector product, generating an initial transformation matrix based on the vector product and the roughness, and constructing a local coordinate system based on the normal vector and the view vector;
performing spatial transformation on the initial transformation matrix based on the local coordinate system to obtain a target transformation matrix;
transforming a vertex corresponding to the vertex position data to the local coordinate system based on the target transformation matrix, the shading point data and the vertex position data, and performing spherical projection on the vertex transformed to the local coordinate system to obtain a vertex projectively transformed onto a spherical surface; and
performing vector integration based on the vertex projectively transformed onto the spherical surface, and using the obtained accumulated integration result as a first lighting vector associated with the area light.

3. The method according to claim 2, wherein the transforming a vertex corresponding to the vertex position data to the local coordinate system based on the target transformation matrix, the shading point data and the vertex position data, and performing spherical projection on the vertex transformed to the local coordinate system to obtain a vertex projectively transformed onto a spherical surface comprises:
obtaining a position difference between the vertex position data and the shading point data, performing matrix transformation on the position difference based on the target transformation matrix to obtain transformation position data, and using a vertex corresponding to the transformation position data as a vertex transformed to the local coordinate system; and
normalizing the transformation position data corresponding to the vertex transformed to the local coordinate system to obtain projection position data, and using a vertex corresponding to the projection position data as a vertex projectively transformed onto a spherical surface.

4. The method according to claim 1, wherein the plane equation data comprises a plane normal vector of a plane where the area light is located and a light distance between an origin in a world coordinate system and the plane.

5. The method according to claim 4, wherein the determining relative position information between a shading point corresponding to the shading point data and the area light based on the plane equation data and the shading point data in the service resource data, and determining a second lighting vector based on the relative position information and the first lighting vector comprises:
performing point multiplication on the plane normal vector and the shading point data to obtain a point multiplication result;
adding the point multiplication result and the light distance to obtain an addition result, and determining relative position information between a shading point corresponding to the shading point data and the area light based on the addition result; and
determining a second lighting vector based on the relative position information and the first lighting vector.

6. The method according to claim 1, wherein the generating target rendering data for rendering the virtual scene based on the second lighting vector and the inverse matrix transformation data comprises:
obtaining a vector length of the second lighting vector, and a first sphere parameter based on the vector length;
obtaining a unit vector associated with the second lighting vector, and a second sphere parameter based on the unit vector;
searching a first integration table based on the first sphere parameter and the second sphere parameter an integration result as initial rendering data of the area light; and
generating target rendering data for rendering the virtual scene based on the initial rendering data of the area light.

7. The method according to claim 1, wherein the generating target rendering data for rendering the virtual scene based on the second lighting vector and the inverse matrix transformation data comprises:
determining initial rendering data of the area light based on the second lighting vector and environmental rendering data of the virtual scene based on the inverse matrix transformation data, respectively;
adding the environmental rendering data and the initial rendering data to obtain a highlight result;

searching a second integration table based on the vector product and the roughness for an integration result as a target normalization coefficient associated with the Fresnel term; and determining the target rendering data for rendering the virtual scene based on the highlight result, the target normalization coefficient and the material attribute corresponding to the shading point.

8. A computer device, comprising: a processor and a memory, wherein the processor is connected to the memory, the memory is configured to store a computer program that, when executed by the processor, causes the computer device to perform a method including:

obtaining service resource data associated with a virtual scene containing an area light, the service resource data containing shading point data, inverse matrix transformation data, vertex position data and plane equation data associated with the area light;

generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface;

determining relative position information between a shading point corresponding to the shading point data and the area light based on the plane equation data and the shading point data in the service resource data, and a second lighting vector based on the relative position information and the first lighting vector; and generating target rendering data for rendering the virtual scene based on the second lighting vector and the inverse matrix transformation data.

9. The computer device according to claim 8, wherein the inverse matrix transformation data contains a normal vector, a view vector and roughness associated with the shading point corresponding to the shading point data;

the generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface comprises:

performing point multiplication on the normal vector and the view vector to obtain a vector product, generating an initial transformation matrix based on the vector product and the roughness, and constructing a local coordinate system based on the normal vector and the view vector;

performing spatial transformation on the initial transformation matrix based on the local coordinate system to obtain a target transformation matrix;

transforming a vertex corresponding to the vertex position data to the local coordinate system based on the target transformation matrix, the shading point data and the vertex position data, and performing spherical projection on the vertex transformed to the local coordinate system to obtain a vertex projectively transformed onto a spherical surface; and performing vector integration based on the vertex projectively transformed onto the spherical surface, and using the obtained accumulated integration result as a first lighting vector associated with the area light.

10. The computer device according to claim 9, wherein the transforming a vertex corresponding to the vertex position data to the local coordinate system based on the target transformation matrix, the shading point data and the vertex position data, and performing spherical projection on the vertex transformed to the local coordinate system to obtain a vertex projectively transformed onto a spherical surface comprises:

obtaining a position difference between the vertex position data and the shading point data, performing matrix transformation on the position difference based on the target transformation matrix to obtain transformation position data, and using a vertex corresponding to the transformation position data as a vertex transformed to the local coordinate system; and normalizing the transformation position data corresponding to the vertex transformed to the local coordinate system to obtain projection position data, and using a vertex corresponding to the projection position data as a vertex projectively transformed onto a spherical surface.

11. The computer device according to claim 8, wherein the plane equation data comprises a plane normal vector of a plane where the area light is located and a light distance between an origin in a world coordinate system and the plane.

12. The computer device according to claim 11, wherein the determining relative position information between a shading point corresponding to the shading point data and the area light based on the plane equation data and the shading point data in the service resource data, and determining a second lighting vector based on the relative position information and the first lighting vector comprises:

performing point multiplication on the plane normal vector and the shading point data to obtain a point multiplication result;

adding the point multiplication result and the light distance to obtain an addition result, and determining relative position information between a shading point corresponding to the shading point data and the area light based on the addition result; and determining a second lighting vector based on the relative position information and the first lighting vector.

13. The computer device according to claim 8, wherein the generating target rendering data for rendering the virtual scene based on the second lighting vector and the inverse matrix transformation data comprises:

obtaining a vector length of the second lighting vector, and a first sphere parameter based on the vector length;

obtaining a unit vector associated with the second lighting vector, and a second sphere parameter based on the unit vector;

searching a first integration table based on the first sphere parameter and the second sphere parameter an integration result as initial rendering data of the area light; and generating target rendering data for rendering the virtual scene based on the initial rendering data of the area light.

14. The computer device according to claim 8, wherein the generating target rendering data for rendering the virtual scene based on the second lighting vector and the inverse matrix transformation data comprises:

determining initial rendering data of the area light based on the second lighting vector and environmental rendering data of the virtual scene based on the inverse matrix transformation data, respectively;

adding the environmental rendering data and the initial rendering data to obtain a highlight result;

searching a second integration table based on the vector product and the roughness for an integration result as a target normalization coefficient associated with the Fresnel term; and determining the target rendering data for rendering the virtual scene based on the highlight result, the target normalization coefficient and the material attribute corresponding to the shading point.

15. A non-transitory computer-readable storage medium, storing a computer program that, when executed by a processor of a computer device, causes the computer device to perform a method including:

obtaining service resource data associated with a virtual scene containing an area light, the service resource data containing shading point data, inverse matrix transformation data, vertex position data and plane equation data associated with the area light;

generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface;

determining relative position information between a shading point corresponding to the shading point data and the area light based on the plane equation data and the shading point data in the service resource data, and a second lighting vector based on the relative position information and the first lighting vector; and generating target rendering data for rendering the virtual scene based on the second lighting vector and the inverse matrix transformation data.

16. The non-transitory computer-readable storage medium according to claim 15, wherein the inverse matrix transformation data contains a normal vector, a view vector and roughness associated with the shading point corresponding to the shading point data;

the generating a target transformation matrix based on the inverse matrix transformation data, projectively transforming a vertex corresponding to the vertex position data onto a spherical surface based on the target transformation matrix, the shading point data and the vertex position data, and generating a first lighting vector associated with the area light based on the vertex projectively transformed onto the spherical surface comprises:

performing point multiplication on the normal vector and the view vector to obtain a vector product, generating an initial transformation matrix based on the vector product and the roughness, and constructing a local coordinate system based on the normal vector and the view vector;

performing spatial transformation on the initial transformation matrix based on the local coordinate system to obtain a target transformation matrix;

transforming a vertex corresponding to the vertex position data to the local coordinate system based on the target transformation matrix, the shading point data and the vertex position data, and performing spherical projection on the vertex transformed to the local coordinate system to obtain a vertex projectively transformed onto a spherical surface; and performing vector integration based on the vertex projectively transformed onto the spherical surface, and using the obtained accumulated integration result as a first lighting vector associated with the area light.

17. The non-transitory computer-readable storage medium according to claim 16, wherein the transforming a vertex corresponding to the vertex position data to the local coordinate system based on the target transformation matrix, the shading point data and the vertex position data, and performing spherical projection on the vertex transformed to the local coordinate system to obtain a vertex projectively transformed onto a spherical surface comprises:

obtaining a position difference between the vertex position data and the shading point data, performing matrix transformation on the position difference based on the target transformation matrix to obtain transformation position data, and using a vertex corresponding to the transformation position data as a vertex transformed to the local coordinate system; and normalizing the transformation position data corresponding to the vertex transformed to the local coordinate system to obtain projection position data, and using a vertex corresponding to the projection position data as a vertex projectively transformed onto a spherical surface.

18. The non-transitory computer-readable storage medium according to claim 15, wherein the plane equation data comprises a plane normal vector of a plane where the area light is located and a light distance between an origin in a world coordinate system and the plane.

19. The non-transitory computer-readable storage medium according to claim 15, wherein the generating target rendering data for rendering the virtual scene based on the second lighting vector and the inverse matrix transformation data comprises:

obtaining a vector length of the second lighting vector, and a first sphere parameter based on the vector length;

obtaining a unit vector associated with the second lighting vector, and a second sphere parameter based on the unit vector;

searching a first integration table based on the first sphere parameter and the second sphere parameter an integration result as initial rendering data of the area light; and generating target rendering data for rendering the virtual scene based on the initial rendering data of the area light.

20. The non-transitory computer-readable storage medium according to claim 15, wherein the generating target rendering data for rendering the virtual scene based on the second lighting vector and the inverse matrix transformation data comprises:

determining initial rendering data of the area light based on the second lighting vector and environmental rendering data of the virtual scene based on the inverse matrix transformation data, respectively;

adding the environmental rendering data and the initial rendering data to obtain a highlight result;

searching a second integration table based on the vector product and the roughness for an integration result as a target normalization coefficient associated with the Fresnel term; and determining the target rendering data for rendering the virtual scene based on the highlight result, the target normalization coefficient and the material attribute corresponding to the shading point.

\* \* \* \* \*